US011503509B2

(12) United States Patent
Yuan et al.

(10) Patent No.: US 11,503,509 B2
(45) Date of Patent: Nov. 15, 2022

(54) APPLICATION SERVER SWITCHING METHOD, SESSION MANAGEMENT NETWORK ELEMENT, AND TERMINAL DEVICE

(71) Applicant: HUAWEI TECHNOLOGIES CO., LTD., Shenzhen (CN)

(72) Inventors: Liping Yuan, Beijing (CN); Xiang Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 16/913,261

(22) Filed: Jun. 26, 2020

(65) Prior Publication Data

US 2020/0329403 A1 Oct. 15, 2020

Related U.S. Application Data

(63) Continuation of application No. PCT/CN2018/124108, filed on Dec. 27, 2018.

(30) Foreign Application Priority Data

Dec. 27, 2017 (CN) ........................ 201711450503.9

(51) Int. Cl.
*H04W 36/00* (2009.01)
*H04L 67/142* (2022.01)
(Continued)

(52) U.S. Cl.
CPC .... *H04W 36/0011* (2013.01); *H04W 36/0055* (2013.01)

(58) Field of Classification Search
CPC ....... H04L 29/12; H04L 67/142; H04L 67/26; H04W 36/0011; H04W 36/0055; H04W 36/12; H04W 48/17
See application file for complete search history.

(56) References Cited

U.S. PATENT DOCUMENTS 10,206,094 B1 * 2/2019 Wen .................... H04W 64/006
10,555,146 B2 * 2/2020 Zhu ......................... H04W 4/50
(Continued)

FOREIGN PATENT DOCUMENTS

CN 103679324 A 3/2014
CN 105122731 A 12/2015
(Continued)

OTHER PUBLICATIONS

S2-173155 Nokia et al. ,"TS 23.502: Handover procedure correction for UPF relocation",SA WG2 Meeting #121,May 15-19, 2017, Hangzhou, China,total 10 pages.
(Continued)

*Primary Examiner* — Ahmed Elallam
(74) *Attorney, Agent, or Firm* — Hauptman Ham, LLP

(57) ABSTRACT

An application server switching method, applied to a scenario in which a handover occurs between user plane network elements corresponding to a terminal device, includes obtaining, based on a user plane network element of the user plane network elements after the handover and a correspondence between the user plane network element and an address of a local application server of one or more application servers deployed on a network, the address of the local application server corresponding to the user plane network element after the handover. The correspondence between the user plane network element and the address of the local application server is used to indicate the address of the local application server. The method also includes sending the address of the local application server corresponding to the user plane network element after the handover.

21 Claims, 16 Drawing Sheets

(51) Int. Cl.

| | |
|---|---|
| ***H04L 67/55*** | (2022.01) |
| *H04W 48/00* | (2009.01) |

(56) References Cited

U.S. PATENT DOCUMENTS

| | | | | |
|---|---|---|---|---|
| 10,587,503 | B2 * | 3/2020 | Yu | H04L 61/4511 |
| 10,681,603 | B2 * | 6/2020 | Zhang | H04W 36/0055 |
| 10,798,762 | B2 * | 10/2020 | Xu | H04W 8/08 |
| 10,972,552 | B2 * | 4/2021 | Li | H04L 47/19 |
| 11,115,876 | B2 * | 9/2021 | Sun | H04W 36/18 |
| 2015/0181550 | A1 * | 6/2015 | Ward | H04W 4/02 455/456.1 |
| 2017/0288972 | A1 | 10/2017 | Li et al. | |
| 2017/0366618 | A1 | 12/2017 | Vrzic et al. | |
| 2019/0045409 | A1 * | 2/2019 | Rasanen | H04W 36/12 |
| 2019/0182717 | A1 * | 6/2019 | Ye | H04W 36/38 |
| 2021/0044675 | A1 * | 2/2021 | Frydman | H04W 8/005 |

FOREIGN PATENT DOCUMENTS

| | | | | |
|---|---|---|---|---|
| CN | 109275160 | A * | 1/2019 | H04W 28/0226 |
| CN | 109936614 | B * | 9/2021 | |
| WO | 2017127102 | A1 | 7/2017 | |
| WO | 2017129742 | A1 | 8/2017 | |
| WO | 2017176307 | A1 | 10/2017 | |

OTHER PUBLICATIONS

S2-173214 CATT,"23 502: UPF relocation due to UE s mobility",3GPP TSG SA WG2 Meeting #121,May 15-19, 2017, Hangzhou, China,total 4 pages.

3GPP TS 23.502 V15.0 0 (Dec. 2017),3rd Generation Partnership Project Technical Specification Group Services and System Aspects;Procedures for the 5G System;Stage 2(Release 15), dated Dec. 22, 2017,total 257 pages.

3GPP TSG SA WG2 Meeting # S2-170370,: "Application-friendly UP Management", Huawei, HiSilicon, Time, Location, total 14 pages.

Chinese Office Action issued in corresponding Chinese Application No. 201711450503.9, dated Feb. 2, 2021, pp. 1-26.

3GPP TSG SA WG2 Metting # S2-170370, Huawei, HiSilicon, Application-friendly UP Management, Agenda Item: 6.5.3, 5GS_Ph1/Rel-15, 14 pages.

Fabio Giust: NEC Europe Ltd., MEC Mobility Management, Jul. 14, 2015, 10 pages.

Draft ETSI GR MEC 018 VO.3.4 (Jun. 2017), Mobile Edge Computing (MEC); End to End Mobility Aspects, 53 pages.

European Search Report issued in corresponding European Patent Application No. 18895305.3, dated Dec. 1, 2020, pp. 1-13, European Patent Office, Munich, Germany.

Chinese Notice of Allowance issued in corresponding Chinese Application No. 201711450503.9, dated Sep. 5, 2022, pp. 1-4.

* cited by examiner

APPLICATION SERVER SWITCHING METHOD, SESSION MANAGEMENT NETWORK ELEMENT, AND TERMINAL DEVICE

CROSS-REFERENCE TO RELATED APPLICATIONS

This application is a continuation of International Application No. PCT/CN2018/124108, filed on Dec. 27, 2018, which claims priority to Chinese Patent Application No. 201711450503.9, filed on Dec. 27, 2017. The disclosures of the aforementioned applications are hereby incorporated by reference in their entireties.

TECHNICAL FIELD

This application relates to the field of communications technologies, and in particular, to an application server switching method, a session management network element, and a terminal device.

BACKGROUND

Mobile edge computing (MEC) is a technology that deeply integrates an access network and an internet service based on a 5th generation (5G) mobile communications architecture. With the MEC, an application server (AS) and some service processing and resource scheduling functions of a mobile broadband (MBB) core network are deployed at a network edge close to an access network. Services are processed in the proximity of users, to implement reliable and ultra-low latency service processing.

Application servers that provide a same service are usually deployed on neighboring mobile edge platforms (MEP) to provide ultimate service experience. The MEP is connected to a corresponding user plane network element. However, a terminal device often moves, and therefore a handover occurs between user plane network elements corresponding to the terminal device. In this case, if the terminal device still accesses an application server that the terminal device accesses before the handover, reliable and ultra-low latency service processing cannot be ensured.

Therefore, how a terminal device obtains a reliable and low-latency service provided by a local application server in a scenario in which a handover occurs between user plane network elements corresponding to the terminal device is currently an urgent problem to be resolved.

SUMMARY

This application provides an application server switching method, a session management network element, and a terminal device, so that in a scenario in which a handover occurs between user plane network elements corresponding to the terminal device, the terminal device can obtain a reliable and low-latency service provided by a local application server.

According to one aspect, an application server switching method is provided. The method is applied to a scenario in which a handover occurs between user plane network elements corresponding to a terminal device. The method includes: obtaining, by a session management network element based on a user plane network element after the handover and a correspondence between a user plane network element and an address of a local application server, an address of a local application server corresponding to the user plane network element after the handover, where the correspondence between the user plane network element and the address of the local application server is used to indicate an address of a local application server, in one or more application servers that are deployed on a network and that provide a same service, that can provide the service for a terminal device when the terminal device accesses one user plane network element; and sending, by the session management network element to the terminal device, the address of the local application server corresponding to the user plane network element after the handover. In this aspect, in the scenario in which the handover occurs between the UPFs corresponding to the UE, the UE may access the local application server corresponding to the UPF after the handover. Therefore, the UE can obtain a reliable and low-latency service provided by the local application server.

In a possible implementation, the local application server comprises an application server with a highest priority in the one or more application servers that provide the same service, or an application server topologically closest to the user plane network element that the terminal device accesses. In this implementation, an application server with a highest priority or topologically closest to the UPF after the handover may be considered as an optimal local application server corresponding to the UPF after the handover.

In another possible implementation, the method further includes: storing, by the session management network element, the correspondence between the user plane network element and the address of the local application server. In this implementation, the session management network element stores one or more correspondences between a user plane network element and an address of a local application server.

In still another possible implementation, the storing, by the session management network element, the correspondence between the user plane network element and the address of the local application server includes: receiving, by the session management network element, a correspondence, sent by a network exposure network element, between the user plane network element and an address of a registered local application server, and storing the correspondence into a stored correspondence between a user plane network element and an address of a local application server. In this implementation, the correspondence is sent by the NEF. Once there is a newly registered application server, the correspondence, stored in the SMF, between the UPF and the address of the local application server is updated, so that the correspondence stored in the SMF can be updated in real time.

In yet another possible implementation, the storing, by the session management network element, the correspondence between the user plane network element and the address of the local application server includes: receiving and storing, by the session management network element, a correspondence, configured by an operations support system, between the user plane network element and the address of the local application server. In this implementation, the correspondence is manually configured. The OSS may directly send one or more correspondences between a UPF and an address of a local application server to the SMF, and the SMF stores the correspondences.

In still yet another possible implementation, the method further includes: receiving, by the session management network element, a first enabling identifier, sent by the network exposure network element, for pushing the address of the local application server for the service; or receiving, by the session management network element, a first enabling identifier, configured by the operations support system, for pushing the address of the local application server for the service. In this implementation, in a scenario in which a handover occurs between UPFs, if an address of a local application server for a specific service needs to be pushed to the terminal device, a function of pushing the address of the local application server for the service needs to be enabled. After obtaining the enabling identifier and when determining that the handover occurs between the UPFs corresponding to the terminal device, the SMF pushes, to the terminal device, the address of the local application server corresponding to the UPF.

In a further possible implementation, the enabling identifier is used to indicate the session management network element to push the address of the local application server to the terminal device after the handover occurs between the user plane network elements corresponding to the terminal device.

In a still further possible implementation, the method further includes: obtaining, by the session management network element, subscription information of the terminal device from a unified data management network element, where the subscription information includes a second enabling identifier for pushing the address of the local application server to the terminal device; and determining, by the session management network element based on the subscription information, to push the address of the local application server to the terminal device. In this implementation, for a specific terminal device, when the terminal device moves and a handover occurs between UPFs corresponding to the terminal device, whether an address of a local application server corresponding to a UPF after the handover needs to be pushed to the terminal device may also be configured. When perceiving that the handover occurs between the UPFs corresponding to the terminal device, the SMF obtains subscription information of the terminal device from the UDM. If the subscription information includes the enabling identifier, the SMF pushes the address of the local application server to the terminal device.

In a yet further possible implementation, the method further includes: receiving, by the session management network element, an identifier and/or a user attribute of the terminal device that are/is sent by the operations support system and that enable/enables a function of pushing the address of the local application server; and determining, by the session management network element based on the identifier and/or the user attribute of the terminal device, to push the address of the local application server to the terminal device. In this implementation, after receiving the identifier or the user attribute that is of the terminal device and that enables the function of pushing the address, the SMF determines, for a specific terminal device, whether the identifier or the user attribute that is of the terminal device and stored in the SMF and that enables the function of pushing the address includes an identifier or a user attribute of the terminal device, and therefore determines whether to push the address of the local application server to the specific terminal device.

In a still yet further possible implementation, the method further includes: receiving, by the session management network element, an identifier that is of the terminal device and sent by an application network element and that enables a function of pushing the address of the local application server; and determining, by the session management network element based on the identifier of the terminal device, to push the address of the local application server to the terminal device. In this implementation, the AF stores the identifier of the terminal device, and sends, to the SMF, the identifier that is of the terminal device and that enables the function of pushing the address. After receiving the identifier that is of the terminal device and that enables the push function, the SMF determines, for a specific terminal device, whether the identifier that is of the terminal device and stored in the SMF and that enables the function of pushing the address includes an identifier of the terminal device, and therefore determines whether to push the address of the local application server to the specific terminal device.

In even yet another possible implementation, the sending, by the session management network element to the terminal device, the address of the local application server corresponding to the user plane network element after the handover includes: sending, by the session management network element, an application trigger request to the terminal device, where the application trigger request includes the address of the local application server corresponding to the user plane network element after the handover; or sending, by the session management network element to the application network element, the address of the local application server corresponding to the user plane network element after the handover, and sending, by the application network element to the terminal device, the address of the local application server corresponding to the user plane network element after the handover. In this implementation, the SMF sends, to the terminal device, the address of the local application server corresponding to the UPF after the handover. The SMF may send the address of the local application server to the terminal device by using an application trigger mechanism (that is, over a control plane channel), or when the terminal device has communicated with the AF, the AF sends the address of the local application server to the terminal device over a data channel.

According to another aspect, an application server switching method is provided. The method is applied to a scenario in which a handover occurs between user plane network elements corresponding to a terminal device. The method includes: receiving, by the terminal device, an application trigger request, where the application trigger request includes an address of a local application server corresponding to a user plane network element after the handover; and accessing, by the terminal device, the local application server based on the address of the local application server corresponding to the user plane network element after the handover. In this aspect, in the scenario in which the handover occurs between the UPFs corresponding to the UE, the UE may access the local application server corresponding to the UPF after the handover. Therefore, the UE can obtain a reliable and low-latency service provided by the local application server.

In a possible implementation, the receiving, by the terminal device, an application trigger request includes: receiving, by the terminal device, the application trigger request sent by a session management network element or an application network element.

According to still another aspect, a session management network element is provided. The session management network element has a function of implementing actions of the session management network element in the foregoing method. The function may be implemented by hardware, or may be implemented by hardware executing corresponding software. The hardware or software includes one or more modules corresponding to the foregoing function.

In a possible implementation, the session management network element includes: a first obtaining unit, configured to obtain, based on a user plane network element after a handover and a correspondence between a user plane network element and an address of a local application server, an address of a local application server corresponding to the user plane network element after the handover, where the correspondence between the user plane network element and the address of the local application server is used to indicate an address of a local application server, in one or more application servers that are deployed on a network and that provide a same service, that can provide the service for a terminal device when the terminal device accesses one user plane network element; and a sending unit, configured to send, to the terminal device, the address of the local application server corresponding to the user plane network element after the handover.

In another possible implementation, the session management network element includes a receiver, a transmitter, a memory, and a processor. The memory stores a set of program code. The processor is configured to invoke the program code stored in the memory, to perform the following operations: obtaining, based on a user plane network element after a handover and a correspondence between a user plane network element and an address of a local application server, an address of a local application server corresponding to the user plane network element after the handover, where the correspondence between the user plane network element and the address of the local application server is used to indicate an address of a local application server, in one or more application servers that are deployed on a network and that provide a same service, that can provide the service for a terminal device when the terminal device accesses one user plane network element; and sending, to the terminal device, the address of the local application server corresponding to the user plane network element after the handover.

Based on a same application concept, for a problem-resolving principle and beneficial effects of the apparatus, refer to the foregoing possible method implementations of the session management network element and the brought beneficial effects. Therefore, for implementation of the apparatus, refer to the implementation of the method. Repeated parts are not described again.

According to yet another aspect, a communications apparatus is provided. The communications apparatus may be a chip (such as a baseband chip or a communications chip) or a device (such as a terminal device). The foregoing method may be implemented by software, hardware, or hardware executing corresponding software.

In a possible implementation, a structure of the communications apparatus includes a processor and a memory. The processor is configured to support the communications apparatus in performing a corresponding function in the foregoing method. The memory is configured to be coupled to the processor, and the memory stores a necessary program (instruction) and/or data of the apparatus. Optionally, the communications apparatus may further include a communications interface, configured to support communication between the communications apparatus and another network element.

In another possible implementation, the communications apparatus may include a receiving unit and an access unit. The receiving unit is configured to receive an application trigger request, where the application trigger request includes an address of a local application server corresponding to a user plane network element after a handover. The access unit is configured to access the local application server based on the address of the local application server corresponding to the user plane network element after the handover.

When the communications apparatus is a chip, the receiving unit may be an input unit, for example, an input circuit or a communications interface; and the sending unit may be an output unit, for example, an output circuit or a communications interface. When the communications apparatus is a device, the receiving unit may be a receiver (which may also be referred to as a receiver); and the sending unit may be a transmitter (which may also be referred to as a transmitter or a transmitter).

According to still yet another aspect, a computer-readable storage medium is provided. The computer-readable storage medium stores an instruction. When the instruction is run on a computer, the computer is enabled to perform the methods according to the foregoing aspects.

According to a further aspect, a computer program product including an instruction is provided. When the computer program product runs on a computer, the computer is enabled to perform the methods according to the foregoing aspects.

BRIEF DESCRIPTION OF DRAWINGS

To describe the technical solutions in the embodiments of this application or in the background more clearly, the following briefly describes the accompanying drawings required for describing the embodiments of this application or the background.

DESCRIPTION OF EMBODIMENTS

The following describes the embodiments of this application with reference to the accompanying drawings in the embodiments of this application.

Figure 1:
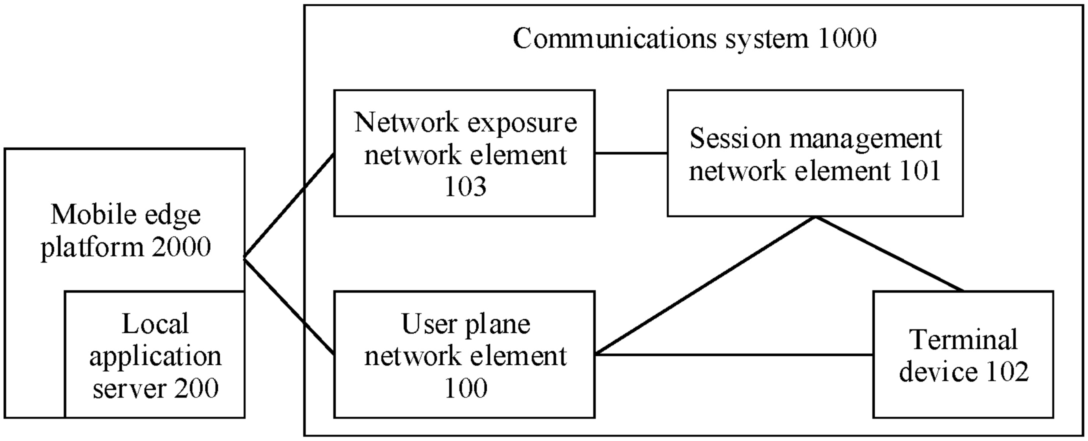
FIG. 1 is a schematic structural diagram of a communications system according to an embodiment of this application.

This application provides a communications system. FIG. 1 is a schematic structural diagram of a communications system 1000 according to an embodiment of this application. The communications system 1000 may include a user plane network element 100 and a session management network element 101. The communications system 1000 may further include a terminal device 102 and a network exposure network element 103. The communications system 1000 is connected to a mobile edge platform 2000. One or more local application servers 200 that provide a same service are deployed on the mobile edge platform 2000 (only one local application server is shown in FIG. 1). Specifically, each mobile edge platform 2000 on which the local application server 200 is deployed is connected to one user plane network element 100, and the user plane network element 100 may be connected to one or more mobile edge platforms 2000. The terminal device 102 accesses, over a data/user plane channel established with the user plane network element 100, the local application server 200 deployed on the mobile edge platform 2000. The terminal device 102 may further perform signaling interaction with the network exposure network element 103 and the user plane network element 100 by using the session management network element 101. It should be noted that the session management network element and the user plane network element are merely names, and the names constitute no limitation on the network elements. For example, the session management network element may be replaced by a "session management function" or another name. In addition, the session management network element may further correspond to a network element including another function in addition to the session management function. The user plane network element may be replaced by a "user plane function" or another name. In addition, the user plane network element may further correspond to a network element including another function in addition to the user plane function. A description is provided herein, and details are not described below again.

In the embodiments of this application, a session management network element obtains, based on a user plane network element after a handover and a correspondence between a user plane network element and an address of a local application server, an address of a local application server corresponding to the user plane network element after the handover. The correspondence between the user plane network element and the address of the local application server is used to indicate an address of a local application server, in one or more application servers that are deployed on a network and that provide a same service, that can provide the service for a terminal device when the terminal device accesses one user plane network element. The session management network element sends, to the terminal device, the address of the local application server corresponding to the user plane network element after the handover.

Figure 2:
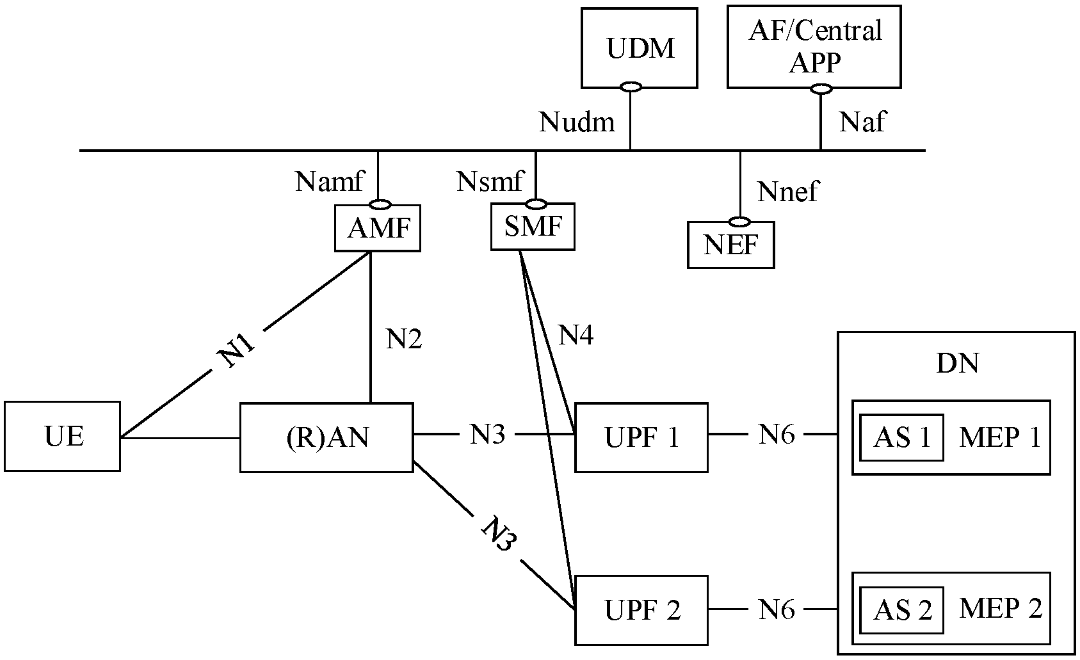
FIG. 2 is a schematic diagram of an example architecture of a next-generation communications system according to an embodiment of this application.

A next-generation communications system is used as an example. FIG. 2 is a schematic diagram of an example architecture of a next-generation communications system according to an embodiment of this application. The communications system may include a user plane function (UPF) entity and a session management function (SMF) entity, and may further include a network exposure function (NEF) entity. The user plane network element 100 in FIG. 1 may be the UPF herein. The session management network element 101 in FIG. 1 may be the SMF herein. The network exposure network element 103 in FIG. 1 may be the NEF herein. The communications system is connected to one or more mobile edge platforms (only two MEPs are shown in FIG. 2). One or more local application servers are deployed on each MEP (only one AS deployed on each of a MEP 1 and a MEP 2 is shown in FIG. 2, and an AS 1 and an AS 2 may provide a same service). The UPF is mainly responsible for forwarding a data packet, controlling quality of service (QoS), collecting charging information, and the like. The SMF is responsible for unified session management.

It should be noted that signaling interaction between the session management function entity and a terminal device is not direct. A complete signaling interaction path can be implemented only through an access and mobility management function (AMF) entity and an access network (AN) device or a radio access network (RAN) device. For a data plane channel between the user plane function entity and the terminal device, data/user plane interaction can be performed only through an AN or a RAN. Therefore, the communications system may further include a terminal device, an AN or a RAN, an AMF, a unified data management (unified data management, UDM) function entity, and an application function (AF) entity. The AF may also be referred to as a central application server (Central APP). The terminal device communicates with the user plane function entity and the session management function entity that are located on a network side, to access the local application server deployed on the mobile edge platform. The AN or the RAN is responsible for connecting the terminal device to the network side. The AMF is mainly responsible for access management for the terminal device. The NEF is responsible for receiving a request of the application server for invocation of an underlying network interface, invoking a plurality of network capabilities through a series of network interfaces to obtain an invocation result, and returning the invocation result to the application server. The UDM is responsible for unified management of subscription data of the terminal device.

In FIG. 2, another function entity may be further included, and only several function entities involved in this application are described in detail herein. The entities are connected to each other through Nx interfaces (for example, N1 and N2 in the diagram). It should be noted that the session management function entity and the user plane function entity are merely names, and the names constitute no limitation on the entities. For example, the session management function entity may be replaced by a "session management function" or another name. In addition, the session management function entity may further correspond to an entity including another function in addition to the session management function. The user plane function entity may be replaced by a "user plane function" or another name. In addition, the user plane function entity may further correspond to an entity including another function in addition to the user plane function. A description is provided herein, and details are not described below again.

In specific implementation, any function entity or network element in the system shown in FIG. 1 or FIG. 2 may be implemented by one physical device, or may be jointly implemented by a plurality of physical devices. This is not specifically limited in the embodiments of this application. In other words, it may be understood that any function entity or network element in the system may be a logical function module in a physical device, or may be a logical function module including a plurality of physical devices. This is not specifically limited in the embodiments of this application.

The terminal device shown in FIG. 1 or FIG. 2 is a device having a wireless transceiver function. The terminal device may be deployed on land, including an indoor or outdoor device, a handheld device, a wearable device, or a vehicle-mounted device, or may be deployed on the water (for example, a ship), or may be deployed in the air (for example, an airplane, a balloon, or a satellite). The terminal device may be a mobile phone, a tablet, a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. The terminal device may also be referred to as user equipment (UE), an access terminal device, a UE unit, a UE station, a mobile station, a mobile station, a remote station, a remote terminal device, a mobile device, a UE terminal device, a terminal, a wireless communications device, a UE agent, a UE apparatus, or the like.

For ease of understanding of the technical solutions in the embodiments of this application, the following provides brief descriptions of related technologies in this application.

MEP:

The MEP is a platform formed by deploying an application server and some service processing and resource scheduling functions of an MBB core network at a network edge close to an access network side. Various application servers, domain name system proxy (DNSP) entities, and the like may usually be deployed on the MEP. This is not specifically limited in the embodiments of this application.

Optionally, the MEP in the embodiments of this application may also be referred to as a MEC platform, a MEC system, or the like. This is not specifically limited in the embodiments of this application.

Terminal Application:

The terminal application is a software product installed on a terminal device and used to access a service provided by an application server, and may also be referred to as an application client on the terminal device. For example, a messaging client or a browser on the terminal device may be used to access a service provided by a messaging application server. A description is provided herein, and details are not described below again.

Application Server:

The application server in the embodiments of this application is a carrier that can provide a corresponding service. For example, a messaging application server may be a carrier that can provide a messaging service.

The carrier in the embodiments of this application may be a virtual device, or may be a physical device. This is not specifically limited in the embodiments of this application. The virtual device herein may be, for example, a virtual machine or a container. This is not specifically limited in the embodiments of this application.

Local Application Server and Central Application Server:

The local application server is also referred to as an edge application server, and is an application server deployed on a MEP. The central application server is relative to the edge application server, and may interact with the edge application server, for example, may deliver control information or synchronization data to the edge application server. Therefore, the edge application server usually has all or some functions of the central application server. This is not specifically limited in the embodiments of this application. In addition, because the edge application server is deployed at a network edge near an access network side, that is, deployed at a comparatively low location, a better service, for example, having a lower latency and a higher rate, can be provided for a user.

It should be noted that, in descriptions in the following embodiments of this application, the application server deployed on the MEP may be described as a local application server or an edge application server, or may be directly described as an application server deployed on the MEP. This is not specifically limited in the embodiments of this application. A description is provided herein, and details are not described below again.

Address Assignment for a Local Application Server:

An IP address of the local application server is usually assigned by a MEP when the edge application server is deployed, and certainly, may alternatively be assigned by another address assignment device. The IP address of the edge application server may be a private IP address or a public IP address. This is not specifically limited in the embodiments of this application.

In a possible implementation, an IP address of an application server deployed on each MEP may be in one or more IP address segments, and IP addresses of application servers deployed on different MEPs may be different. For example, a deployment system may assign IP address segments 1.1.0.1 to 1.1.255.255 to the application server on the MEP 1, and assign IP address segments 2.2.0.1 to 2.2.255.255 to the application server on the MEP 2. Further, when the application server is deployed on the MEP 1, the MEP 1 may assign an IP address 1.1.1.2 to an application server corresponding to app.com; when the application server is deployed on the MEP 2, the MEP 2 may assign an IP address 2.2.1.2 to an application server corresponding to app.com.

It should be noted that in the embodiments of this application, an identifier of an MEP is used to uniquely identify one MEP, for example, may be location information of a UPF entity deployed on the MEP, a data network access identifier (data network access identifier, DNAI), or the like. This is not specifically limited in the embodiments of this application. A description is provided herein, and details are not described below again.

Access an Application Server:

In the embodiments of this application, when accessing an application server, a terminal device usually accesses the application server by using a domain name of the application server. The domain name of the application server herein is a real domain name of the application server. For example, assuming that a domain name of an application server is app.com, a process in which the terminal device accesses the application server is as follows:

Step 1: A user enters app.com in a browser or directly opens a terminal application corresponding to the application server for access.

Step 2: The browser or the terminal application initiates a DNS request, to obtain an internet protocol (IP) address corresponding to app.com.

Step 3: An operating system (OS) of the terminal device searches a local DNS cache, and if a DNS record corresponding to app.com is found, directly returns a corresponding IP address to the browser or the terminal application. A mapping relationship between a domain name and an IP address is a DNS record.

Step 4: If no DNS record corresponding to app.com is found in step 3, the terminal device sends a DNS resolution request to a DNS server.

Step 5: After receiving the DNS resolution request from the terminal device, the DNS server performs DNS resolution, and sends an IP address list corresponding to app.com to the terminal device by using a DNS resolution response.

Step 6: After receiving the DNS resolution response from the DNS server, the terminal device returns the IP address corresponding to app.com to the browser or the terminal application, and stores a corresponding DNS record on the terminal device. A cache time of the DNS record on the terminal device may be set based on a time-to-live (TTL) parameter in the DNS resolution response, or may be set by the OS or the terminal application. When the cache time of the DNS record on the terminal device elapses, the DNS cache is cleared or become invalid.

Step 7: After obtaining the IP address corresponding to app.com, the browser or the terminal application initiates a connection request to the application server corresponding to the IP address. Further, the application server may return requested content to the terminal device, and the browser or the terminal application displays the requested content. Until now, the process in which the terminal device accesses the application server is completed.

Figure 3:
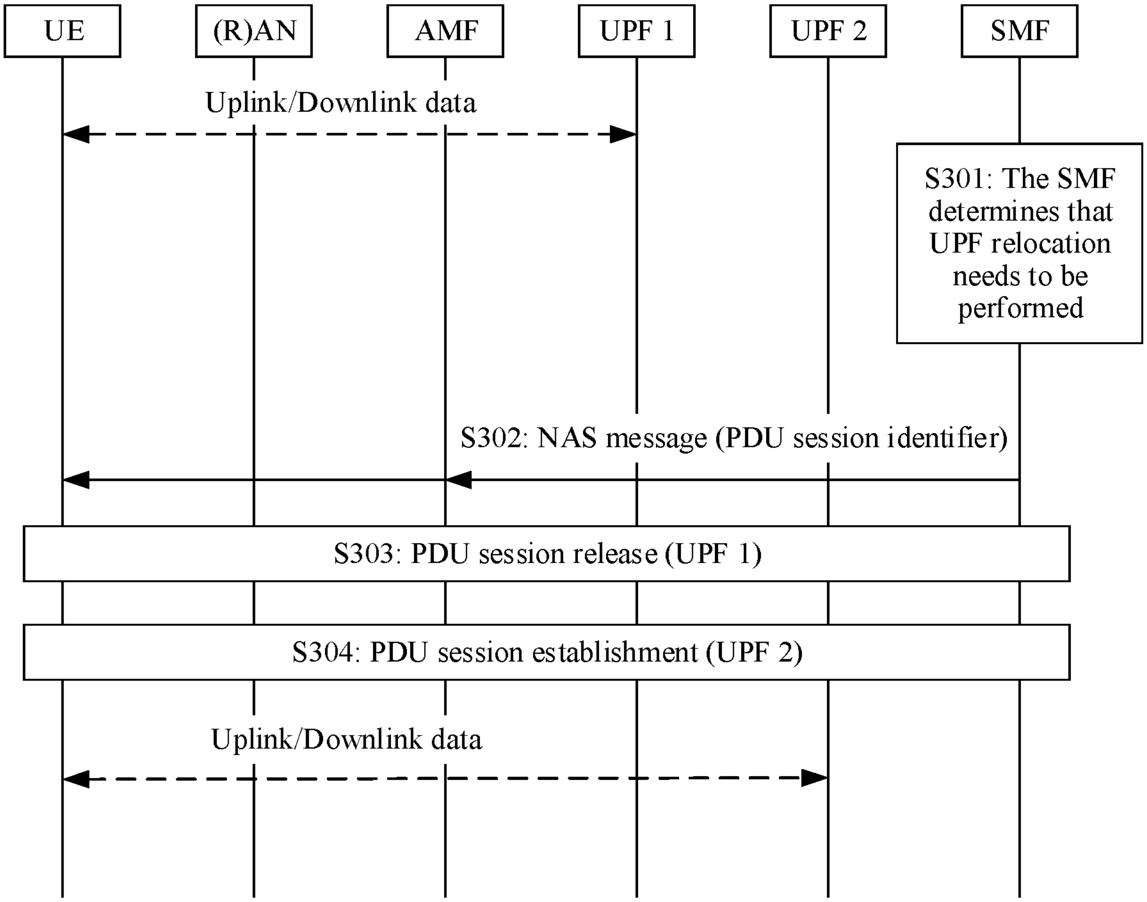
FIG. 3 is a schematic flowchart of a common handover on a mobile edge platform.

UPF Handover and Selection Procedure:

To support session and service continuity in a 5G system architecture, various continuity requirements of different applications/services of a terminal device need to be satisfied. The 5G system supports different session and service continuity (SSC) modes, and mainly supports three SSC modes. Both SSC mode 2 and SSC mode 3 involve a UPF handover. FIG. 3 shows the UPF handover and selection procedure. The following describes the UPF handover and selection procedure by using the SSC mode 2 as an example.

S301: When some events that can benefit from UPF relocation occur, an SMF determines that a serving UPF needs to be relocated.

S302: The SMF sends a non-access stratum (NAS) message to a terminal device by using an AMF. The NAS message includes a protocol data unit (PDU) session identifier.

S303: The SMF performs a PDU session release procedure.

S304: The terminal device initiates a PDU session establishment procedure. Then the AMF forwards the session establishment request to the SMF, and the SMF may select a new UPF to establish a PDU session.

It can be learned that in some scenarios, to ensure session and service continuity, UPF handover and reselection need to be performed.

Figure 4:
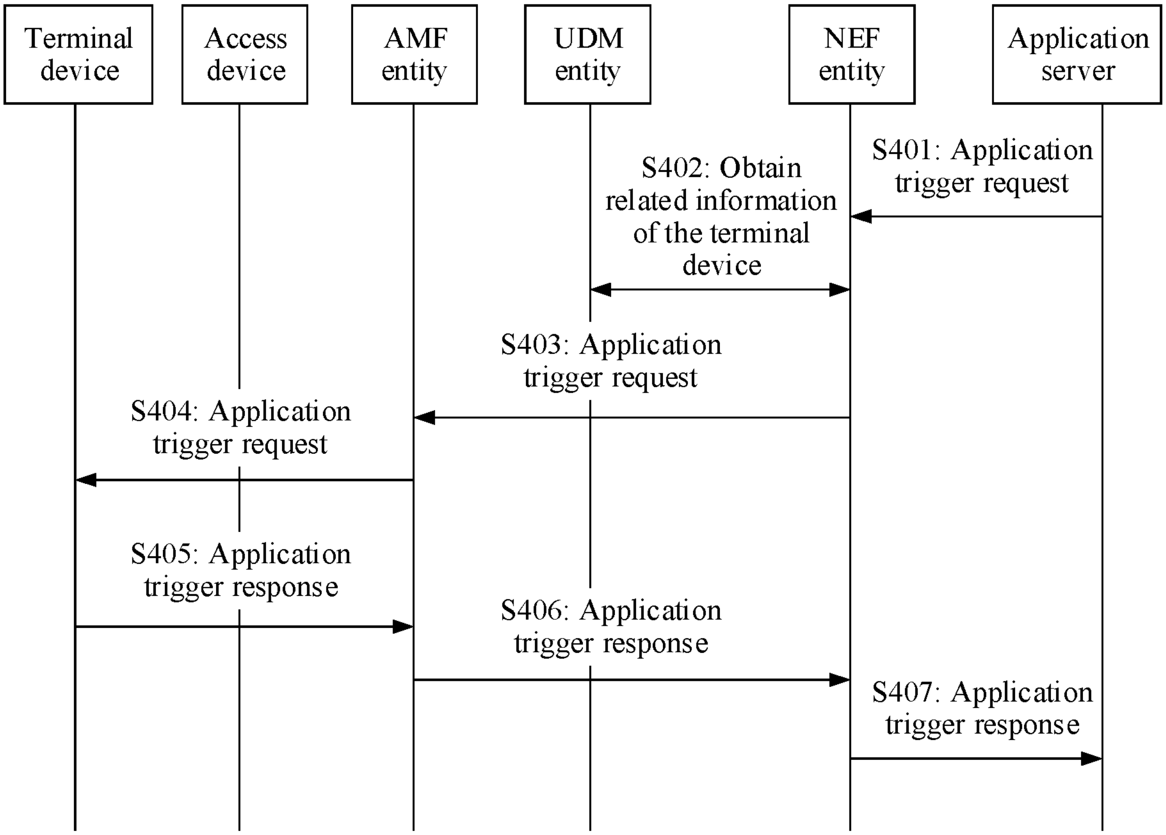
FIG. 4 is a schematic flowchart of a common application trigger mechanism.

Application Trigger (Application Trigger) Mechanism:

The application trigger mechanism provides a method for actively pushing, by an application server by using a core network control plane, a message to a terminal device. This mechanism is described in detail in the 3rd generation partnership project (3GPP) 23.501 4.4.5 and 23.502 5.2.6.1. As shown in FIG. 4, a main procedure includes the following steps.

S401: An application server sends an application trigger request to a network exposure function (NEF) entity, and the NEF entity receives the application trigger request from the application server.

The application trigger request may include an identifier of a terminal device, a requester identifier, a validity period of a message, an identifier of a terminal application, a trigger payload, and the like. The identifier of the terminal device may be, for example, an international mobile subscriber identity (IMSI) or an IP address of the terminal device, and is used to indicate the terminal device to which the message is to be pushed. The requester identifier may be, for example, an IP address or a name of the application server, and is used to indicate the application server that initiates the message. The requester identifier is usually an identifier allocated by an operator or negotiated by the application server and the operator after an agreement that the application server is involved in is signed with the operator, and may be used to perform authentication, quota control, charging, or the like on a message sender. The validity period of the message is used to indicate how long the message is valid. If the message fails to be sent and is still in the validity period, a core network needs to retransmit the message. The identifier of the terminal application may be, for example, a digital identifier or a domain name, and is usually a globally unique identifier allocated by the operator or negotiated by the application server and the operator after the agreement that the application server is involved in is signed with the operator, and is used to indicate the terminal application, on the terminal device, to which the message needs to be sent. The trigger payload is content that the terminal application needs to process. For details, refer to an existing solution. Details are not described herein.

S402: The NEF entity obtains related information of the terminal device from a UDM entity based on the identifier of the terminal device carried in the application trigger request.

The related information of the terminal device may be, for example, information about a core network element that provides a service for the terminal device, for example, an AMF that provides a service for the terminal device.

S403: The NEF entity sends the application trigger request to an AMF entity that serves the terminal device, and the AMF entity receives the application trigger request from the NEF entity.

S404: The AMF entity sends the application trigger request to the terminal device, and the terminal device receives the application trigger request from the AMF entity.

S405: The terminal device sends an application trigger response to the AMF entity, and the AMF entity receives the application trigger response from the terminal device. The application trigger response is used to indicate that the terminal device has successfully received the application trigger request.

S406: The AMF entity sends the application trigger response to the NEF entity, and the NEF entity receives the application trigger response from the AMF entity.

S407: The NEF entity sends the application trigger response to the application server, and the application server receives the application trigger response from the NEF entity.

Until now, a basic procedure of the application trigger mechanism is completed. For specific implementation of steps S401 to S407, refer to an existing application trigger mechanism procedure. Details are not described herein.

It should be noted that the foregoing application trigger procedure can be used only for a terminal device that supports the application trigger mechanism. There may be a plurality of implementations for enabling a terminal device to support the application trigger mechanism. For example, after receiving a non-access stratum (NAS) message, a baseband chip of the terminal device identifies the NAS message as an application trigger request, and may send the application trigger request to an OS of the terminal device for processing. Further, a service provided by the OS of the terminal device may process the application trigger request. Herein, the service provided by the OS of the terminal device is a function or a functional module provided by the operating system, to implement some specific functions, for example, a device control function and a message notification function. A description is provided herein, and details are not described below again. Alternatively, after receiving the application trigger request, the OS of the terminal device may send, for processing, the application trigger request to a specific terminal application based on an identifier that is of the terminal application and that is carried in the application trigger request. This is not specifically limited in the embodiments of this application. Because the terminal application that processes the application trigger request is a special application, the identifier corresponding to the terminal application may be a special identifier allocated by an operator, for example, "0". A description is provided herein, and details are not described below again.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

It should be noted that, terms "system" and "network" in the embodiments of this application may be used interchangeably. "A plurality of" means two or more. In view of this, "a plurality of" may also be understood as "at least two" in the embodiments of this application. The term "and/or" is an association relationship for describing associated objects and indicates that three relationships may exist. For example, A and/or B may indicate the following three cases: Only A exists, both A and B exist, and only B exists. In addition, the character "/" generally indicates an "or" relationship between the associated objects. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" are not intended to limit a quantity or an execution sequence; and the terms such as "first" and "second" do not indicate a definite difference.

Figure 5:
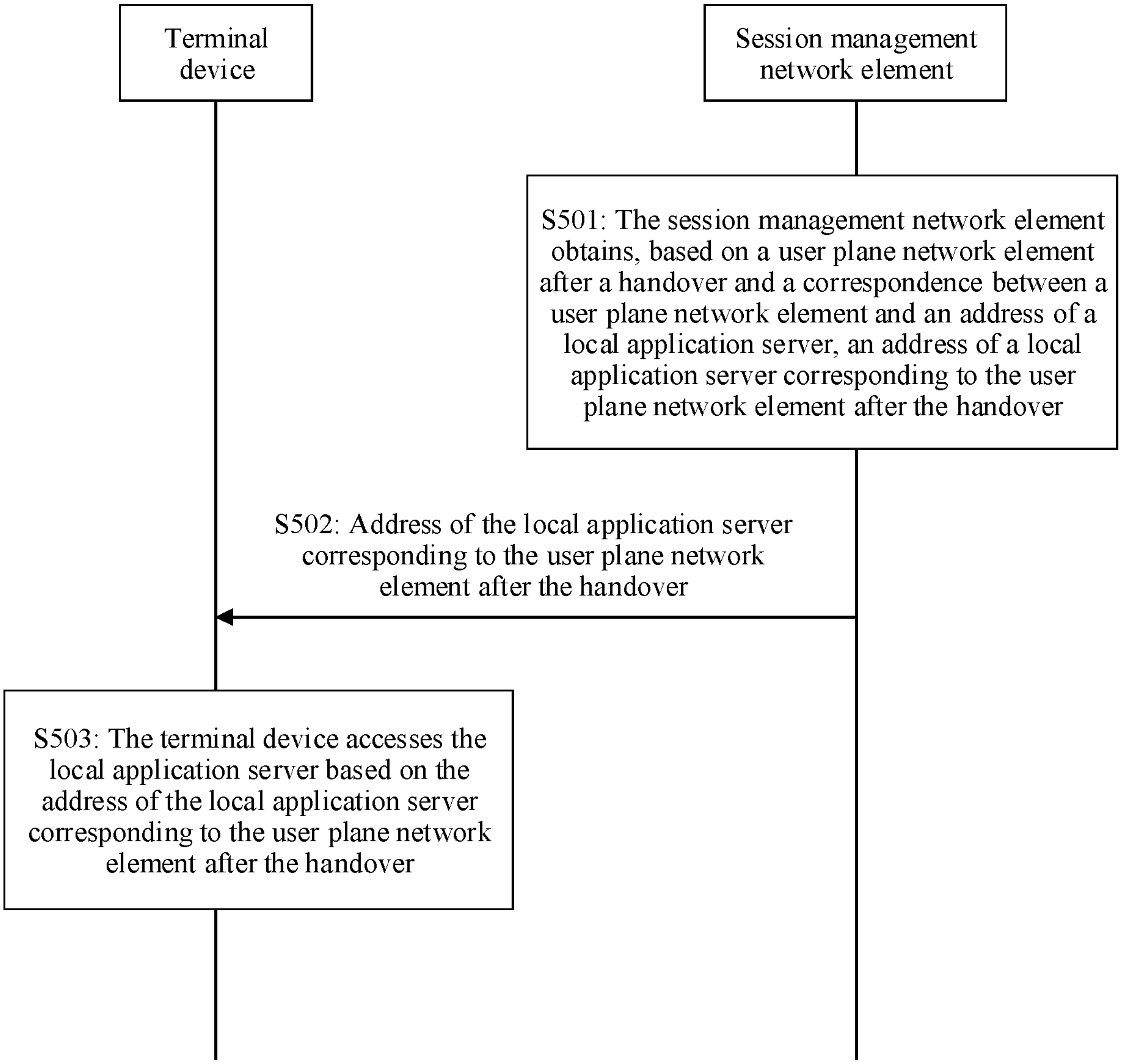
FIG. 5 is a schematic interaction flowchart of an application server switching method according to an embodiment of this application.

FIG. 5 is a schematic interaction flowchart of an application server switching method according to an embodiment of this application. The method is applied to a scenario in which a handover occurs between user plane network elements corresponding to a terminal device. The method may include the following steps:

S501: A session management network element obtains, based on a user plane network element after the handover and a correspondence between a user plane network element and an address of a local application server, an address of a local application server corresponding to the user plane network element after the handover, where the correspondence between the user plane network element and the address of the local application server is used to indicate an address of a local application server, in one or more application servers that are deployed on a network and that provide a same service, that can provide the service for the terminal device when the terminal device accesses one user plane network element.

S502: The session management network element sends, to the terminal device, the address of the local application server corresponding to the user plane network element after the handover. The terminal device receives the address of the local application server corresponding to the user plane network element after the handover.

S503: The terminal device accesses the local application server based on the address of the local application server corresponding to the user plane network element after the handover.

In this embodiment, a next-generation mobile communications system (for example, a 5G system) is used as an example to specifically describe an application server switching procedure. As shown in FIG. 1 or FIG. 2, each MEP is connected to one UPF (certainly, one UPF may be connected to a plurality of MEPs). One or more local application servers are deployed on each MEP. Each local application server may provide one service. There are a plurality of MEPs on a network. When a user moves to another location and accesses a different UPF, a network side can determine an optimal local application server for the user. Specifically, the optimal local application server may be an application server with a highest priority in one or more application servers that provide a same service, or may be an application server topologically closest to a user plane network element that a terminal device accesses. The application server with the highest priority is an application server that is on a MEP connected to the UFP and that is considered, based on an operator configuration, to provide best service quality. Topologically closest means that a communication link between the UPF and the application server is the shortest, an end-to-end latency can be reduced, and communication service quality can be improved. In this embodiment, the SMF stores a correspondence between a UPF and an address of a local application server, and when the local application server deployed on the MEP changes, the SMF updates the correspondence in real time.

FIG. 3 is a schematic flowchart of UPF handover and selection. In some scenarios, to ensure session and service continuity, UPF handover and reselection need to be performed. After a UPF handover, if UE still accesses an application server on a MEP connected to a source UPF, the UE cannot obtain an optimal service because the application server corresponding to the source UPF is usually not an application server with a highest priority in one or more application servers that provide a same service, or an application server topologically closest to a user plane network element that the terminal device accesses. In this embodiment, in a scenario in which a handover occurs between UPFs corresponding to the UE, the SMF obtains, based on a target UPF (which may be specifically an identifier of the target UPF) and the stored correspondence between the UPF and the address of the local application server, an address of a local application server corresponding to the target UPF; and send, to the terminal device, the address of the local application server corresponding to the target UPF. The terminal device may access the local application server based on the address of the local application server corresponding to the target UPF. This ensures that the terminal device can access local application servers that provide a same service and that are on a MEP connected to the UPF after the handover. The application server corresponding to the target UPF is usually an application server with a highest priority in the one or more application servers that provide the same service, or an application server topologically closest to the user plane network element that the terminal device accesses, to ensure that reliable and low-latency service processing can be provided for the terminal device.

Further, before step S501, the method may further include: storing, by the session management network element, the correspondence between the user plane network element and the address of the local application server. The correspondence may be sent by a NEF, or may be manually configured. Specifically:

In an implementation, the storing, by the session management network element, the correspondence between the user plane network element and the address of the local application server specifically includes: receiving, by the session management network element, a correspondence, sent by a network exposure network element, between the user plane network element and an address of a registered local application server, and storing the correspondence into a stored correspondence between a user plane network element and an address of a local application server. In specific implementation, when a new local application server is deployed on a MEP, the local application server needs to register with the MEP and provide an address of the local application server for the MEP. The MEP determines a correspondence between a UPF and the address of the local application server based on deployment location information of the local application server and a topological relationship with the UPF. Then the MEP sends an identifier of the UPF and the address of the local application server to the NEF. The NEF performs authentication and authorization on the newly registered local application server. After the authentication and authorization succeed, the NEF sends the identifier of the UPF and the address of the local application server to the SMF. The SMF receives the identifier of the UPF and the address of the local application server, and records a correspondence between the identifier of the UPF and the address of the local application server. If another new application server registers with the MEP or another MEP, the SMF stores a received correspondence between a UPF and an address of the newly registered local application server into the stored correspondence. Specifically, the correspondence may be stored in the SMF in the form of a table or the like. The following further provides detailed descriptions with reference to a specific procedure. In this implementation, once there is a newly registered application server, the correspondence, stored in the SMF, between the UPF and the address of the local application server is updated, so that the correspondence stored in the SMF can be updated in real time.

In another implementation, the storing, by the session management network element, the correspondence between the user plane network element and the address of the local application server specifically includes: receiving and storing, by the session management network element, a correspondence, configured by an operations support system (OSS), between the user plane network element and the address of the local application server. In specific implementation, the OSS manages local application servers deployed on one or more MEPs, and records an identifier of a UPF and an address of the local application server. In addition, the OSS sends a correspondence between the UPF and the address of the local application server to the SMF, and the SMF stores the correspondence. The following further provides detailed descriptions with reference to a specific procedure. In this implementation, the OSS may directly send one or more correspondences between a UPF and an address of a local application server to the SMF, and the SMF stores the correspondences.

In a scenario in which a handover occurs between UPFs, if an address of a local application server for a specific service needs to be pushed to the terminal device, a function of pushing the address of the local application server for the service needs to be enabled. Therefore, before step S501, the method may further include: obtaining, by the session management network element, a first enabling identifier for pushing the address of the local application server for the service. The first enabling identifier is used to indicate the session management network element to push the address of the local application server to the terminal device after the handover occurs between the user plane network elements corresponding to the terminal device. After obtaining the enabling identifier and when determining that the handover occurs between the UPFs corresponding to the terminal device, the SMF pushes, to the terminal device, the address of the local application server corresponding to the UPF. Specifically:

In an implementation, the obtaining, by the session management network element, a first enabling identifier for pushing the address of the local application server for the service specifically includes: receiving, by the session management network element, the first enabling identifier, sent by the network exposure network element, for pushing the address of the local application server for the service. In specific implementation, in the foregoing procedure in which the MEP sends the identifier of the UPF and the address of the local application server to the NEF, and the NEF sends the identifier of the UPF and the address of the local application server to the SMF, the MEP may further send the enabling identifier to the NEF. Then the NEF sends the enabling identifier to the SMF. The following further provides detailed descriptions with reference to a specific procedure.

In another implementation, the obtaining, by the session management network element, a first enabling identifier for pushing the address of the local application server for the service specifically includes: receiving, by the session management network element, the first enabling identifier, configured by the operations support system, for pushing the address of the local application server for the service. In specific implementation, when managing the local application servers deployed on the one or more MEPs, the OSS further determines whether a function of pushing the address of the local application server to the terminal device needs to be enabled. Therefore, the OSS sends, to the SMF, an enabling identifier for pushing an address of a local application server for a service.

Certainly, there may alternatively be another implementation. For example, an AF may send, to the SMF, the first enabling identifier for pushing an address of a local application server for a service provided by the AF.

For a specific terminal device, when the terminal device moves and a handover occurs between UPFs corresponding to the terminal device, whether an address of a local application server corresponding to a UPF after the handover needs to be pushed to the terminal device may also be configured. Therefore, further, before sending, to the terminal device, the address of the local application server corresponding to the user plane network element after the handover, the session management network element needs to determine whether to push the address of the local application server to the terminal device. Specifically:

In an implementation, before S502, the method further includes: obtaining, by the session management network element, subscription information of the terminal device from a unified data management network element, where the subscription information includes a second enabling identifier for pushing the address of the local application server to the terminal device; and determining, by the session management network element based on the subscription information, to push the address of the local application server to the terminal device. In specific implementation, the UDM manages all subscription information of a terminal device. The subscription information may include an enabling identifier for pushing an address of a local application server to a specific terminal device. When perceiving that a handover occurs between UPFs corresponding to a terminal device, the SMF obtains subscription information of the terminal device from the UDM. If the subscription information includes the enabling identifier, the SMF pushes an address of a local application server to the terminal device.

In another implementation, before S502, the method further includes: receiving, by the session management network element, an identifier and/or a user attribute of the terminal device that are/is sent by the operations support system and that enable/enables a function of pushing the address of the local application server; and determining, by the session management network element based on the identifier and/or the user attribute of the terminal device, to push the address of the local application server to the terminal device. The user attribute may include, for example, at least one of the following information: roaming information, information about an accessed data network, and an access point name APN. The identifier of the terminal device is a fifth generation mobile communications subscription permanent identifier, an international mobile subscriber identity IMSI, or an MSISDN. In specific implementation, the OSS configures the identifier or the user attribute that is of the terminal device and that needs to enable a function of pushing the address of the local application server to the terminal device, and then sends, to the SMF, the identifier or the user attribute that is of the terminal device and that enables the function of pushing the address. After receiving the identifier or the user attribute that is of the terminal device and that enables the function of pushing the address, the SMF determines, for a specific terminal device, whether the identifier or the user attribute that is of the terminal device and stored in the SMF and that enables the function of pushing the address includes an identifier or a user attribute of the terminal device, and therefore determines whether to push the address of the local application server to the specific terminal device.

In still another implementation, before S502, the method further includes: receiving, by the session management network element, an identifier that is of the terminal device and sent by an application function entity and that enables a function of pushing the address of the local application server; and determining, by the session management network element based on the identifier of the terminal device, to push the address of the local application server to the terminal device. In specific implementation, the AF may also determine whether to push an address of a local application server for the AF to a specific terminal device. For example, a terminal device may communicate with a specific AF, and when a handover occurs between UPFs corresponding to the terminal device, an address of a local application server corresponding to a UPF after the handover needs to be pushed to the terminal device. The AF stores the identifier of the terminal device, and sends, to the SMF, the identifier that is of the terminal device and that enables the function of pushing the address. After receiving the identifier that is of the terminal device and that enables the push function, the SMF determines, for a specific terminal device, whether the identifier that is of the terminal device and stored in the SMF and that enables the function of pushing the address includes an identifier of the terminal device, and therefore determines whether to push the address of the local application server to the specific terminal device.

In S502, the SMF sends, to the terminal device, the address of the local application server corresponding to the UPF after the handover. The SMF may send the address of the local application server to the terminal device by using an application trigger mechanism (that is, over a control plane channel), or when the terminal device has communicated with the AF, the AF sends the address of the local application server to the terminal device over a data channel. Specifically:

In an implementation, S502 specifically includes: sending, by the session management network element, an application trigger request to the terminal device, where the application trigger request includes the address of the local application server corresponding to the user plane network element after the handover. The terminal device receives the application trigger request sent by the session management network element. Certainly, the session management network element may alternatively send the application trigger request to the application function entity, the application function entity sends the application trigger request to the terminal device, and the terminal device receives the application trigger request. In specific implementation, in an application trigger procedure shown in FIG. 4, an application trigger mechanism provides a method for actively pushing, by an application server by using a core network control plane, a message to a terminal device. As a core network control plane network element, the SMF needs to use the application trigger mechanism to actively push a message to the terminal device. Specifically, the message is an application trigger request. The application trigger request includes an address of a local application server corresponding to a UPF after a handover. The following further provides detailed descriptions with reference to a specific procedure.

In another implementation, S502 specifically includes: sending, by the session management network element to the application function entity, the address of the local application server corresponding to the user plane network element after the handover, and sending, by the application function entity to the terminal device, the address of the local application server corresponding to the user plane network element after the handover. The terminal device receives the address of the local application server corresponding to the user plane network element after the handover. In specific implementation, if the terminal device is accessing the AF when the terminal device moves, the SMF may send the address of the local application server to the NEF. Then the NEF sends the address of the local application server to the AF. The AF sends the address of the local application server to the terminal device over an established data plane channel.

The following describes, by using specific examples, a complete procedure corresponding to the foregoing method.

Figure 6A:
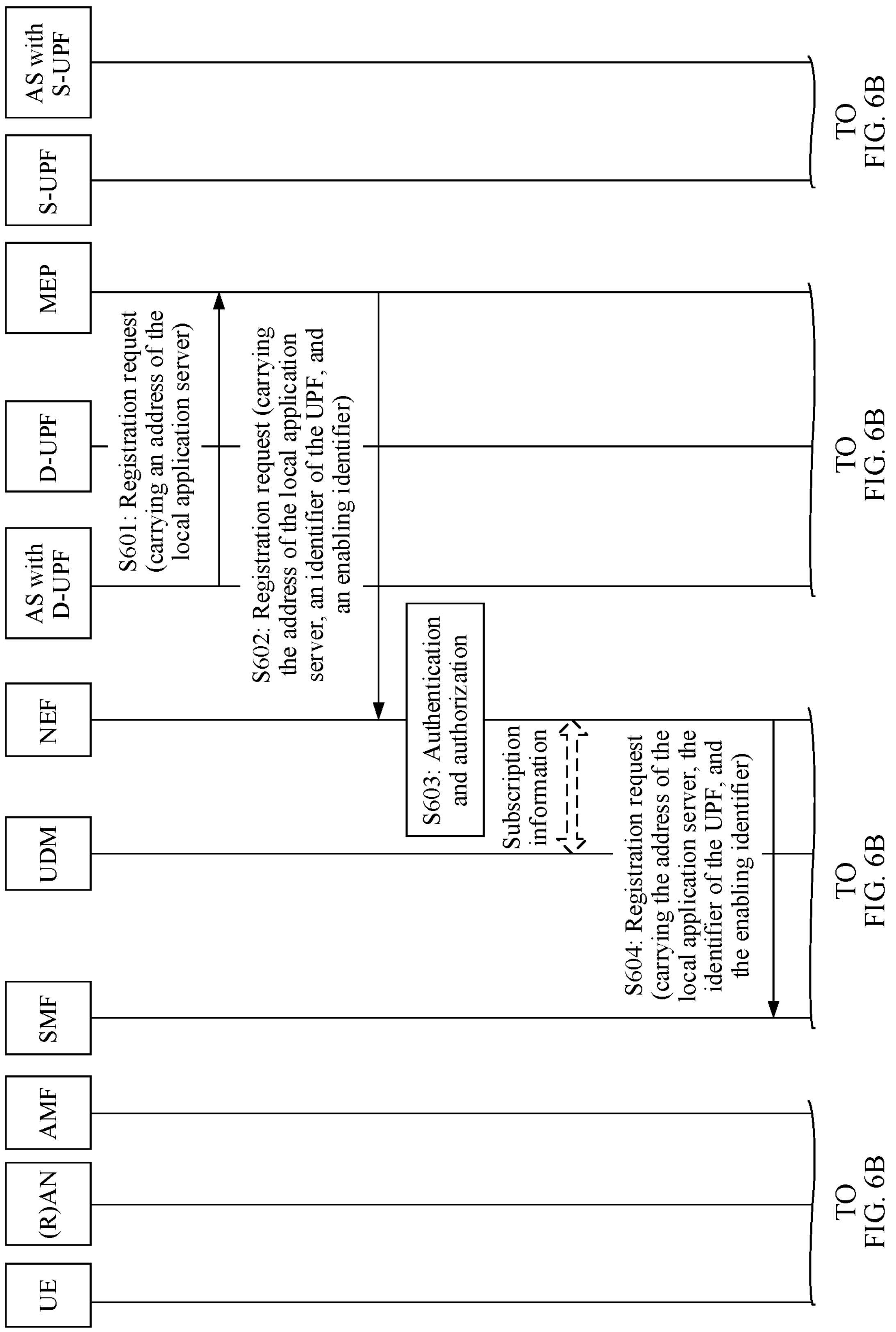
FIG. 6A to FIG. 6C are a schematic flowchart of a specific example of an application server switching method according to an embodiment of this application.
Figure 6B:
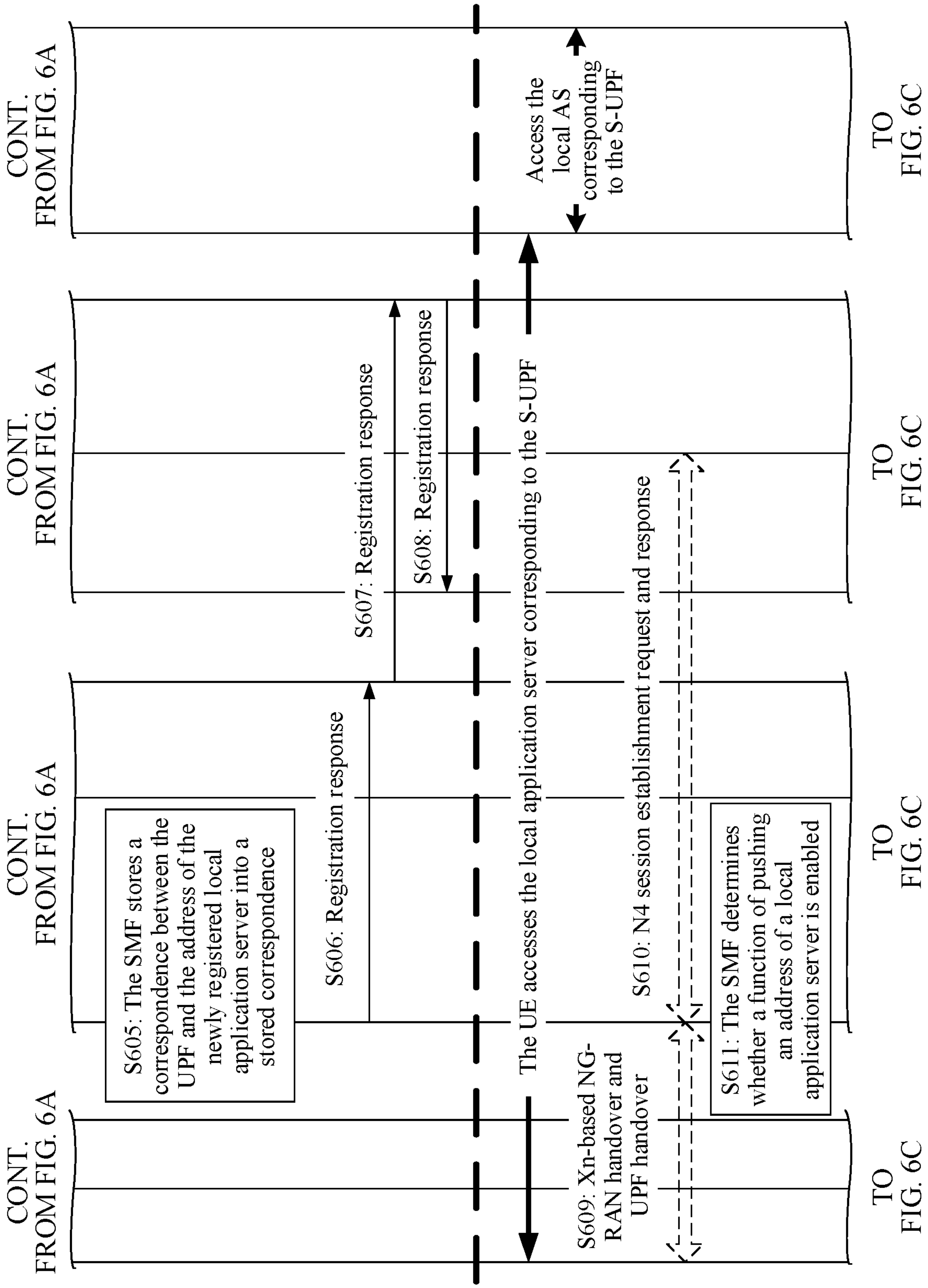
Figure 6C:
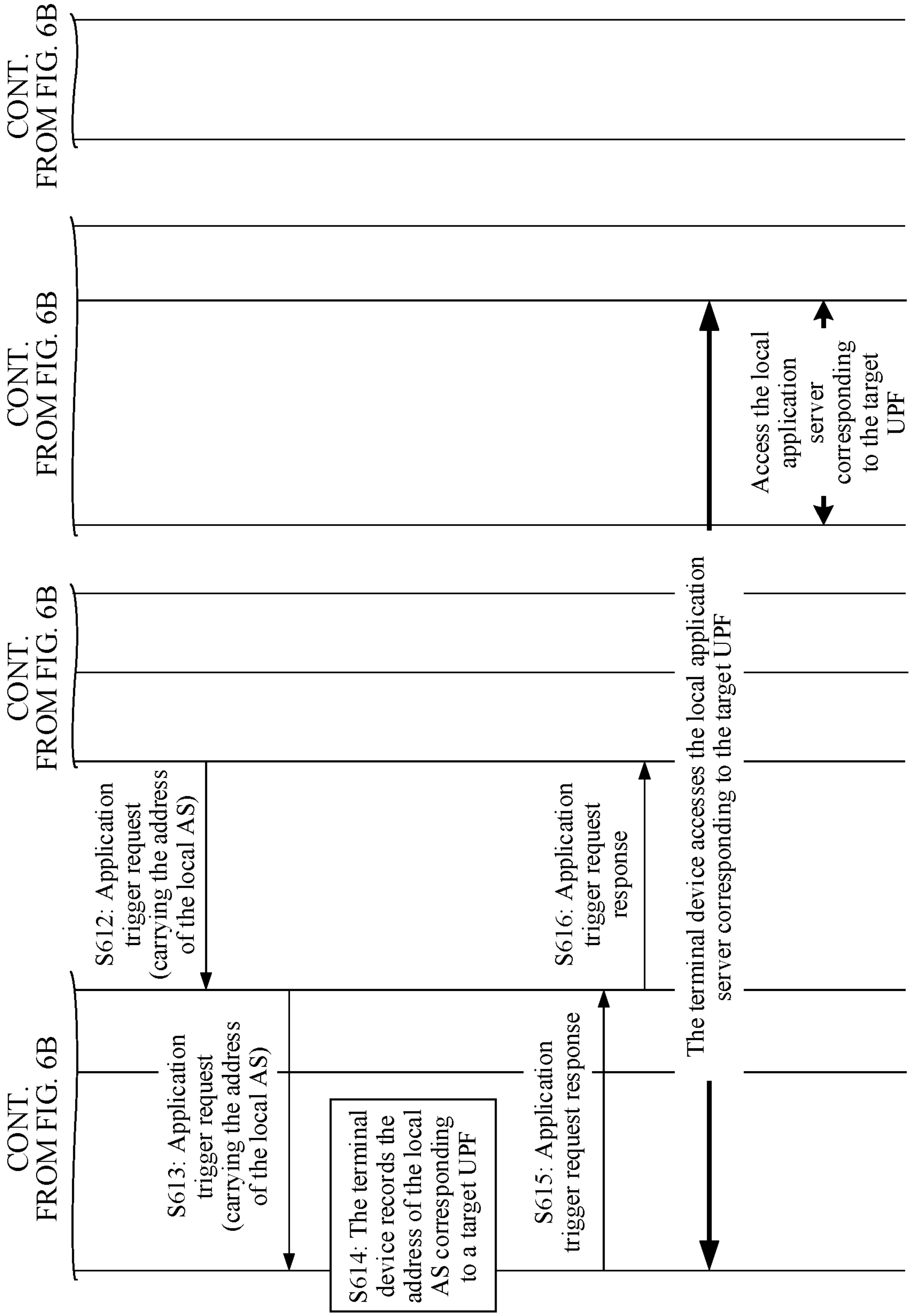

In an example, when a new local application server is deployed on a MEP, after being deployed, the local application server needs to initiate a registration procedure to the MEP. The MEP pushes, based on deployment location information of the local application server and a topological relationship with a UPF, a correspondence between the UPF and an address of the local application server to an SMF by using a NEF, and enables the SMF to actively trigger an application trigger service procedure after a UPF handover procedure, and push, to a terminal device, an address of a local application server corresponding to a UPF after the handover, so that the terminal device can access, in a timely manner after the UPF handover, the local application server corresponding to the UPF after the handover. FIG. 6A to FIG. 6C are a schematic flowchart of a specific example of an application server switching method. The method specifically includes the following steps.

S601: After a new local application server is deployed on a MEP, the local application server initiates a registration procedure, and sends a registration request to the MEP, where the registration request carries an address of the local application server. The MEP receives the registration request.

S602: The MEP determines a correspondence between a UPF and the address of the local application server based on deployment location information of the local application server and a topological relationship with the UPF, or priority information of the local application server. In other words, the correspondence is determined in two manners. In one manner, the correspondence is determined based on the deployment location information of the local application server and the topological relationship with the UPF. The topological relationship with the UPF is a relationship between a deployment location of the UPF and a location of the MEP. A local application server corresponding to the UPF is an application server topologically closest to the UPF. In the other manner, the correspondence is determined based on the priority information of the local application server. An AF usually configures, for each MEP, a priority of a local application server on the MEP. The local application server corresponding to the UPF may be an application server with a highest priority in one or more application servers that provide a same service.

Then the MEP initiates a registration request procedure of the local application server to a NEF on a 5G core network, and sends a registration request to the NEF. The registration request may carry an identifier of the UPF and the address of the local application server, and may further carry an enabling identifier for pushing the address of the local application server.

S603: After receiving the registration request for the local application server from the MEP, the NEF performs authentication and authorization on the MEP based on a standard authentication and authorization procedure.

S604: The NEF sends, to an SMF, the registration request for the local application server that satisfies a requirement. The registration request may carry the identifier of the UPF and the address of the local application server, and may further carry the enabling identifier for pushing the address of the local application server.

S605: After receiving the identifier of the UPF, the address of the local application server, and the enabling identifier, the SMF records the correspondence between the UPF and the address of the new local application server into a stored correspondence; and enables, for a terminal device that accesses a data network corresponding to the local application server, a function of pushing the address of the local application server after a UPF handover.

S606: The SMF sends a registration response message for the local application server to the NEF. The NEF receives the registration response message. The registration response message may include an indication of a registration result. For example, one bit is used to indicate the registration result. "1" indicates that registration succeeds, and "0" indicates that registration fails. Alternatively, "0" indicates that registration succeeds, and "1" indicates that registration fails.

S607: The NEF sends the registration response message for the local application server to the MEP. The MEP receives the registration response message.

S608: The MEP sends the registration response message for the local application server to the local application server. The local application server receives the registration response message, and obtains the registration result.

After accessing a network, a terminal device accesses, by using a source UPF, a local application server corresponding to the source UPF. However, if the terminal device moves, a handover occurs between UPFs corresponding to the terminal device.

S609 and S610: After the terminal device moves, a handover procedure is triggered; the SMF implements a UPF handover procedure based on a UPF selection mechanism defined in a standard and activates a session on a target UPF; and subsequently, the terminal device accesses a data service by using the target UPF. For details, refer to the procedure shown in FIG. 3.

S611: When the handover procedure is triggered during movement of the terminal device, after implementing the UPF handover procedure based on a standard UPF selection procedure, the SMF determines, based on session information, that the terminal device needs to access a specific application, and determines, based on the application, a service, or the terminal device, whether a function of pushing an address of a local application server is enabled.

S612: If the SMF determines that the function of pushing the address of the local application server is enabled, the SMF initiates an application trigger procedure to an AMF; specifically, the SMF sends an application trigger request to the AMF. The application trigger request carries an address of a local application server corresponding to a UPF after the handover. The AMF receives the application trigger request.

S613: After receiving the application trigger request, the AMF sends the application trigger request to the terminal device over a (R)AN based on a standard procedure. The application trigger request carries the address of the local application server corresponding to the UPF after the handover. The terminal device receives the application trigger request.

S614: After receiving the application trigger request, the terminal device obtains, through parsing, the address that is carried in the request and that is of the local application server corresponding to the UPF after the handover, and locally records the address.

S615: The terminal device sends an application trigger request response to the AMF over the (R)AN. The AMF receives the application trigger request response.

S616: The AMF sends the application trigger request response to the SMF. The SMF receives the application trigger request response.

S617: The terminal device initiates a service access procedure based on the address of the new local application server (the address of the local application server corresponding to the UPF after the handover), so that the terminal device can obtain a reliable and low-latency service provided by the local application server.

In this example, after the handover occurs between the UPFs corresponding to the terminal device, the SMF may select the local application server corresponding to the UPF after the handover. The SMF transmits the address of the local application server to the terminal device. In this way, network planning is transparent to the terminal device, the terminal device more quickly discovers the address of the local application server, and service experience of a specified APP on the terminal device is improved.

Figure 7A:
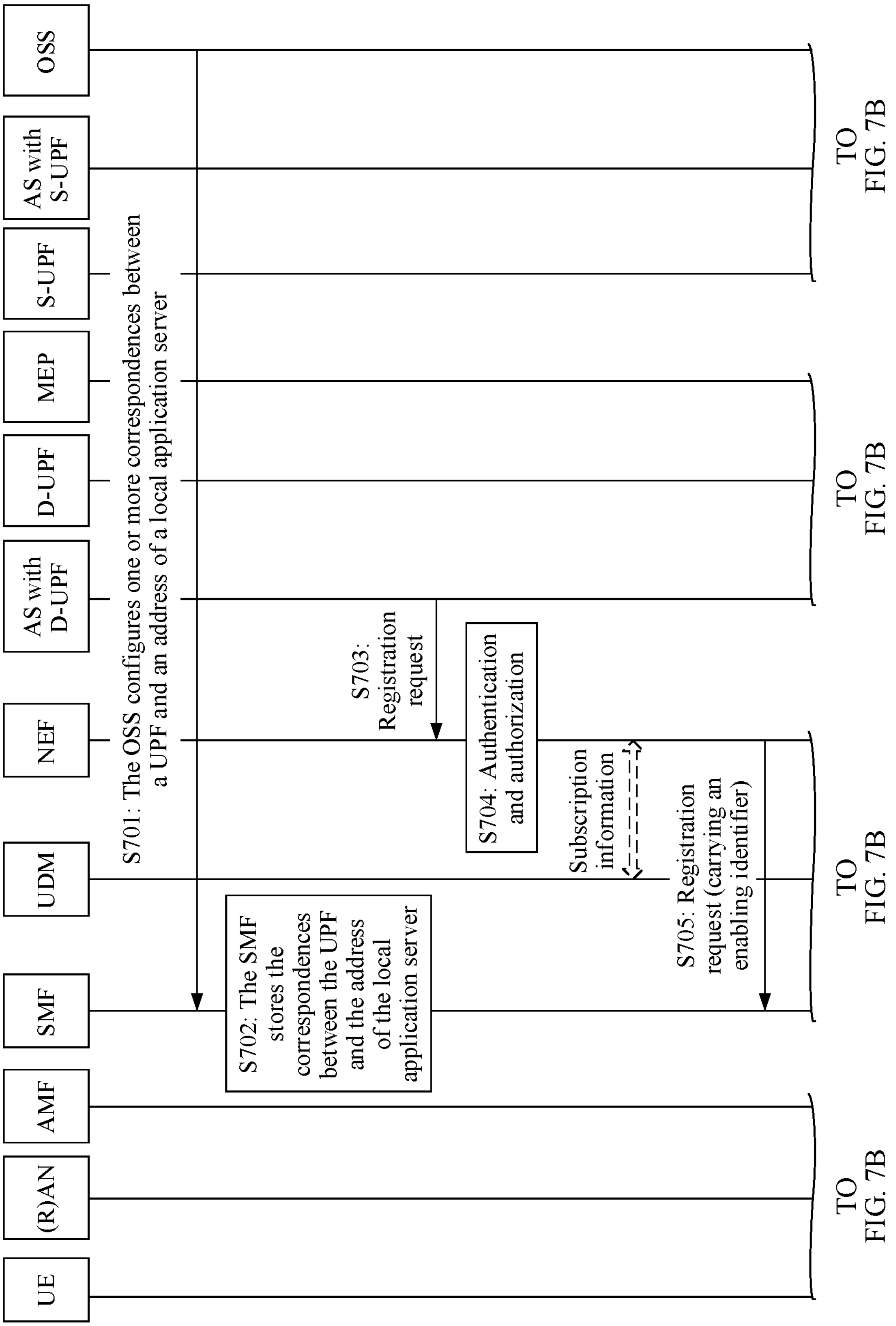
FIG. 7A to FIG. 7C are a schematic flowchart of another specific example of an application server switching method according to an embodiment of this application.
Figure 7B:
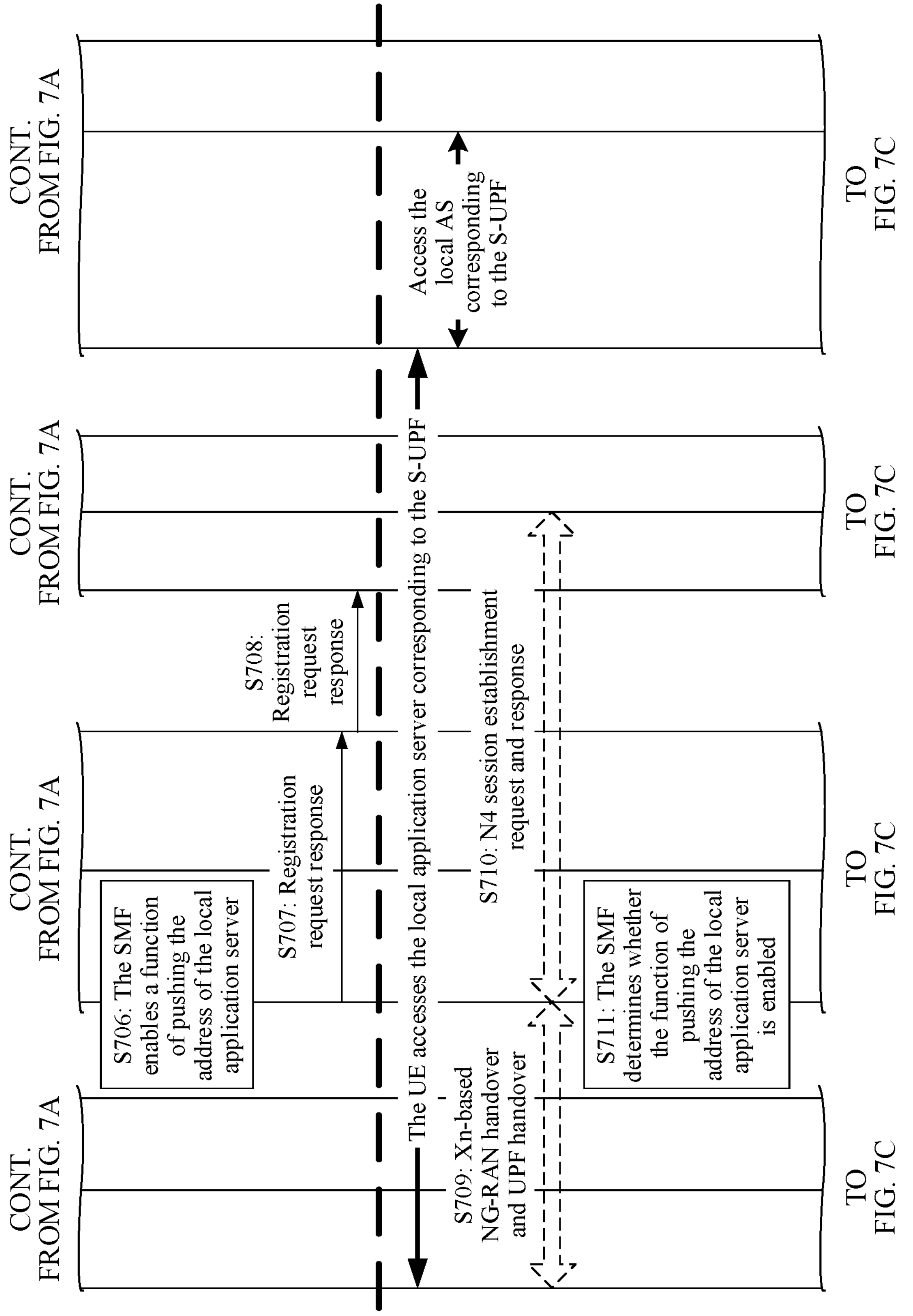
Figure 7C:
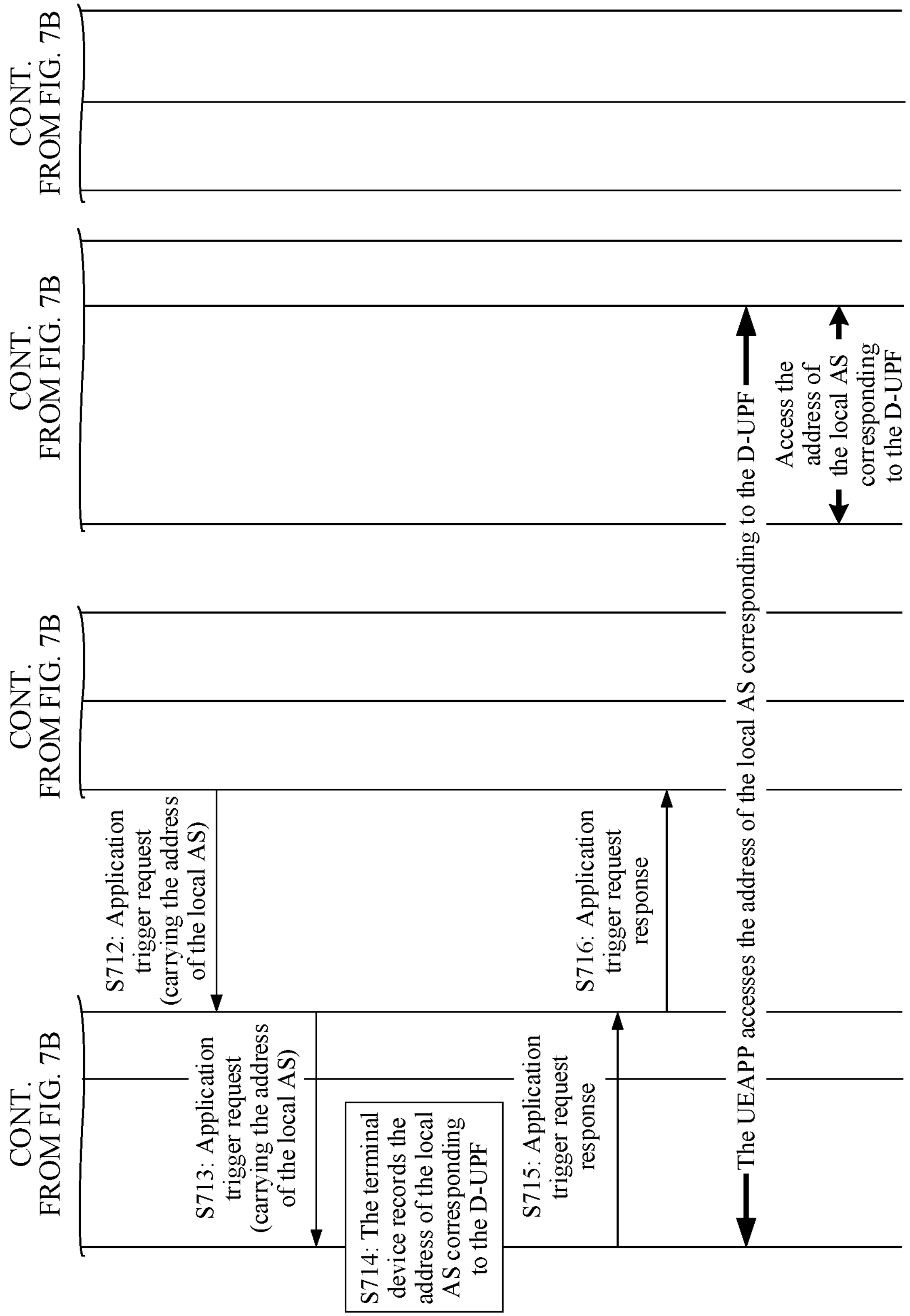
Figure 8A:
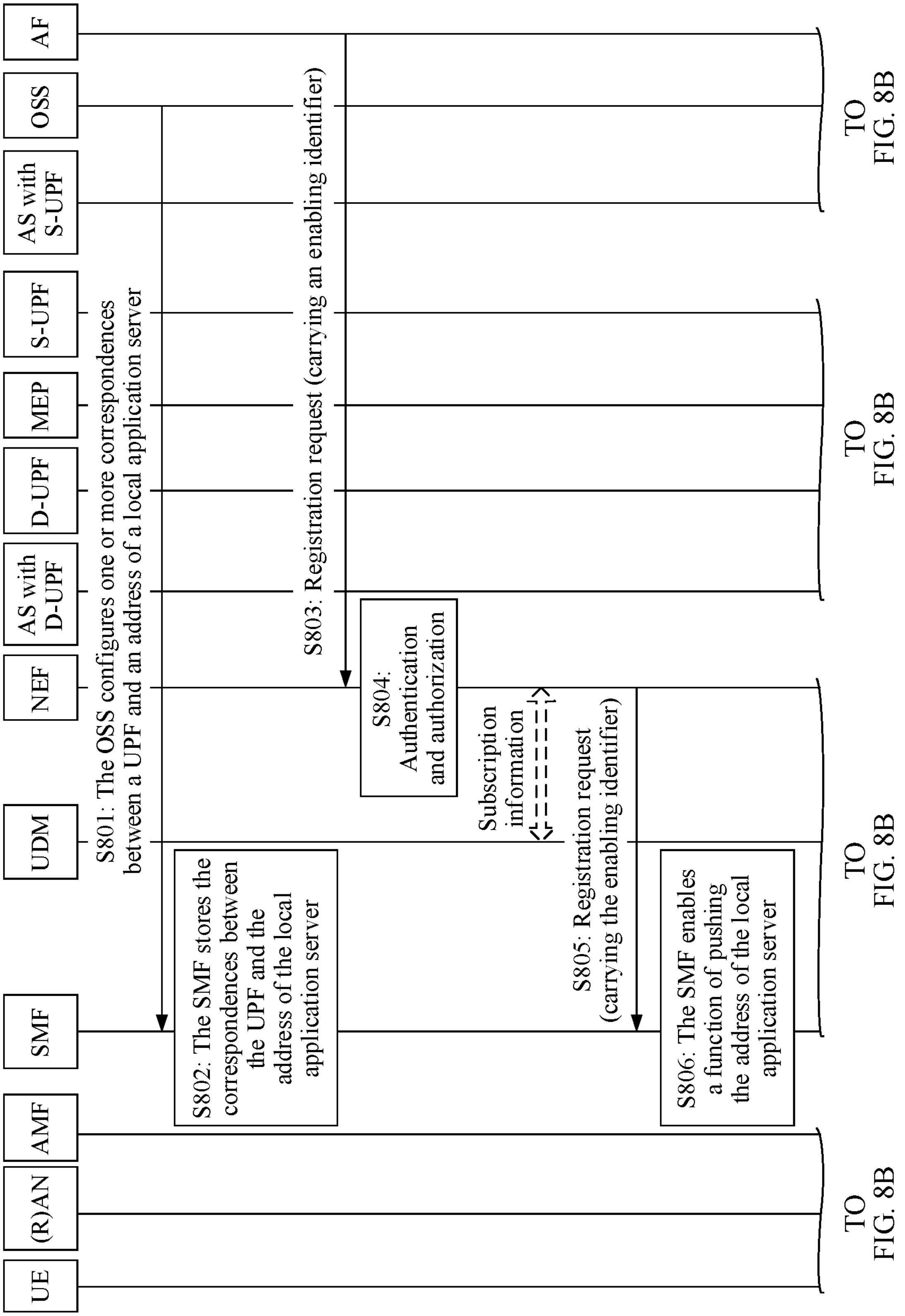
FIG. 8A to FIG. 8D are schematic flowchart of still another specific example of an application server switching method according to an embodiment of this application.
Figure 8B:
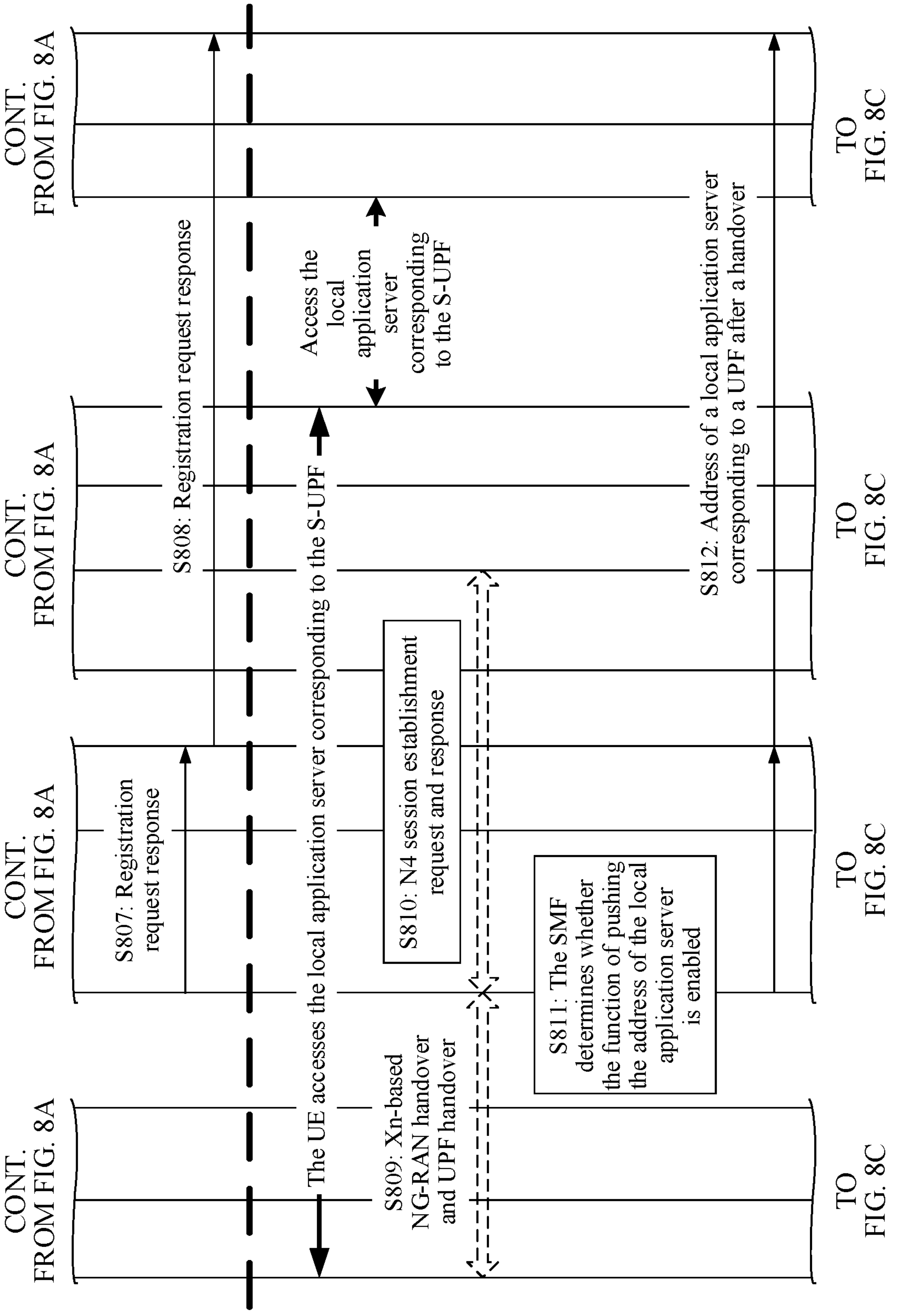
Figure 8C:
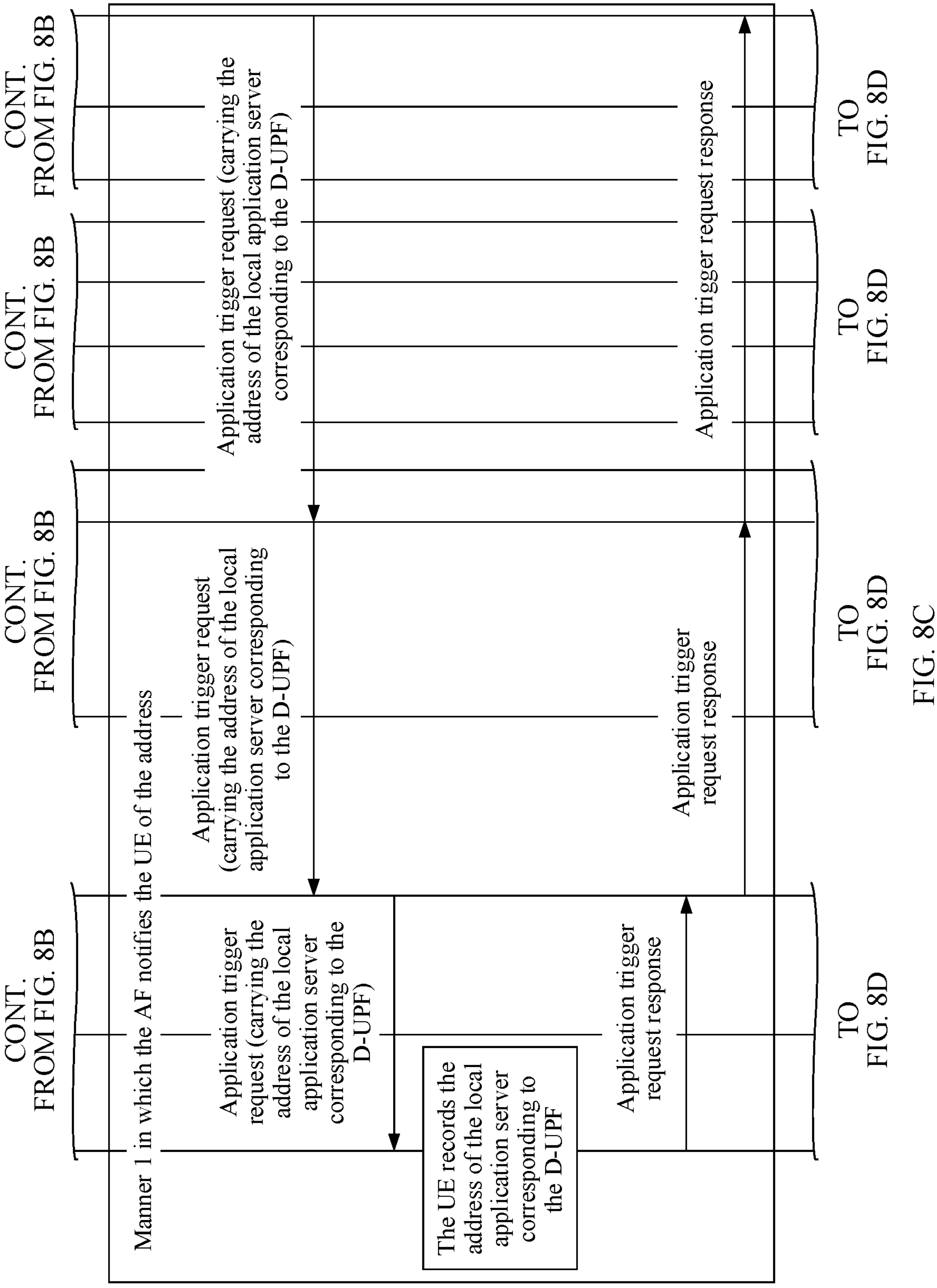
Figure 8D:
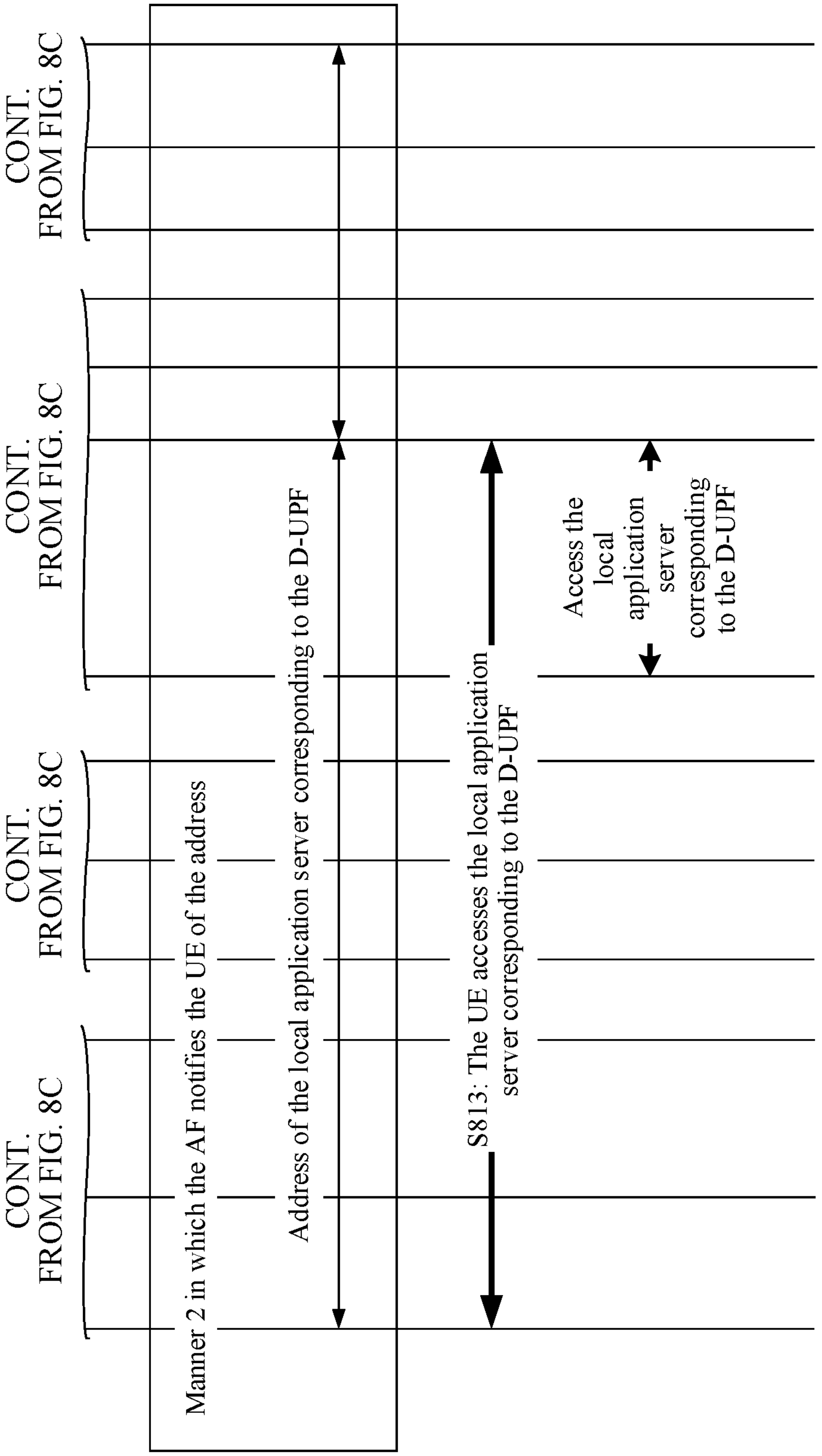

In another example, after being deployed, a local application server needs to initiate a registration procedure to a MEP. An OSS directly configures, in an SMF, a correspondence between a UPF and an address of the local application server. The local application server sends, to the SMF by using a NEF, an enabling identifier for pushing the address of the local application server, to enable the SMF to actively trigger an application trigger service procedure after a UPF selection procedure, and push, to a terminal device, an address of a local application server corresponding to a UPF after a handover. In this way, the terminal device can obtain, in a timely manner after the UPF handover, the address of the local application server corresponding to the UPF, to obtain a reliable and low-latency service provided by the local application server for the terminal device. FIG. 7A to FIG. 7C are a schematic flowchart of another specific example of an application server switching method. The method may specifically include the following steps:

S701: An OSS system configures, in an SMF, one or more correspondences between a UPF and an address of a local application server.

S702: The SMF receives and stores the correspondences.

S703: A local application server deployed on a MEP initiates a registration request procedure of the local application server to a NEF, where a registration request carries an enabling identifier for pushing an address of the local application server after a handover occurs between UPFs corresponding to a terminal device. The NEF receives the enabling identifier.

S704: After receiving the registration request sent by the local application server, the NEF performs authentication and authorization on the local application server based on a standard authentication and authorization procedure.

S705: The NEF pushes, to the SMF, the registration request for the local application server that satisfies a requirement, where the registration request carries the enabling identifier. The SMF receives the enabling identifier.

S706: The SMF enables, for a specified terminal device or a terminal device that accesses a data network corresponding to the local application server, a function of pushing the address of the local application server.

S707: The SMF sends a registration request response to the NEF. The NEF receives the registration request response.

S708: The NEF sends the registration request response to the local application server that initiates the registration request. The local application server receives the registration request response.

A subsequent service procedure is the same as the procedure shown in FIG. 6A to FIG. 6C, and details are not described herein again.

In this example, the OSS on a 5G core network may directly configure a table of a correspondence between a UPF and a local application server. After the handover occurs between the UPFs corresponding to the terminal device, the SMF may select the local application server corresponding to the UPF after the handover. The SMF transmits the address of the local application server to the terminal device. In this way, network planning is transparent to the terminal device, the terminal device more quickly discovers the address of the local application server, and service experience of a specified APP on the terminal device is improved.

In still another example, after being deployed, a local application server needs to initiate a registration procedure to a MEP. An OSS directly configures, in an SMF, a correspondence between a UPF and an address of the local application server. The local application server sends, to the SMF by using a NEF, an enabling identifier for pushing the address of the local application server, to enable the SMF to actively notify an AF after a UPF selection procedure. The AF pushes, to a terminal device by using an application trigger service procedure or over a data plane channel, an address of a local application server corresponding to a UPF after a handover. In this way, the terminal device can obtain, in a timely manner after the UPF handover, the address of the local application server corresponding to the UPF after the handover, to obtain a reliable and low-latency service provided by the local application server. Certainly, the correspondence and the enabling identifier may alternatively be sent to the SMF by using the procedure shown in FIG. 6A to FIG. 6C. FIG. 8A to FIG. 8D are a schematic flowchart of still another specific example of an application server switching method. The method may specifically include the following steps.

S801: An OSS sends, to an SMF, one or more correspondences between a UPF and an address of a local application server. The SMF receives the correspondences.

S802: The SMF stores the correspondences.

S803: An AF initiates a registration request procedure of a local application server to a NEF, where a registration request carries the foregoing enabling identifier. The NEF receives the enabling identifier.

S804: After receiving the registration request for the local application server sent by the AF, the NEF performs authentication and authorization on the local application server based on a standard authentication and authorization procedure.

S805: The NEF pushes, to the SMF, the registration request for the local application server that satisfies a requirement, where the registration request carries the enabling identifier.

S806: After receiving the enabling identifier, the SMF enables, for a specified application or a terminal device that accesses a data network corresponding to the local application server, a function of pushing an address of the local application server after a UPF handover.

S807: The SMF sends a registration response message for the local application server to the NEF. The NEF receives the registration response message.

S808: The NEF sends the registration response message to the AF. The AF receives the registration response message.

After accessing a network, a terminal device accesses, by using a source UPF, a local application server corresponding to the source UPF.

S809 and S810: After the terminal device moves, a handover procedure is triggered; the SMF implements a UPF handover procedure based on a UPF selection mechanism defined in a standard and activates a session on a target UPF; and subsequently, the terminal device accesses a data service by using the target UPF.

S811: After implementing the UPF handover procedure based on a standard UPF selection procedure, the SMF determines, based on session information, that the terminal device needs to access a specific application, and determines, based on the application, a service, or the terminal device, whether a function of pushing an address of a local application server is enabled.

S812: If the SMF determines that the function of pushing the address of the local application server is enabled, the SMF sends, to the AF by using the NEF, an address of a local application server corresponding to the target UPF. The AF receives the address of the local application server.

After receiving the address of the local application server, the AF may push the address of the local application server to the terminal device in two manners:

In one manner, the AF may send an application trigger request to the terminal device through the NEF, an AMF, and a (R)AN based on a standard application trigger procedure. The application trigger request carries the address of the local application server corresponding to the target UPF. After receiving the application trigger request, the terminal device obtains, through parsing, the address of the local application server carried in the request, and locally records the address. The terminal device returns an application trigger request response to the AF through the (R)AN, the AMF, and the NEF.

In the other manner, if the terminal device has established a data plane connection to the AF, the AF may directly push, to the terminal device over the data plane link, the address of the local application server corresponding to the target UPF.

S813: The terminal device initiates a service access procedure based on the address of the new local application server (the address of the local application server corresponding to the UPF after the handover), so that the terminal device can obtain a reliable and low-latency service provided by the local application server.

In this example, after the UPF handover occurs, the SMF notifies the AF of the address of the local application server corresponding to the UPF after the handover. The AF pushes the address of the local application server to the terminal device by using an application trigger procedure or over a data plane channel. In this way, network planning is transparent to the terminal device, and the terminal device more quickly discovers the address of the local application server. Therefore, the terminal device can obtain a reliable and low-latency service provided by the local application server.

It can be learned that in a mobile edge computing scenario, an edge platform and a network side can cooperate to obtain a correspondence between an address of a local application server and a UPF after a handover. After the UPF handover, a terminal device can better select a local application server. Network planning is transparent to the terminal device, and the terminal device more quickly discovers the local application server.

According to the application server switching method provided in the embodiments of this application, in a scenario in which a handover occurs between user plane network elements corresponding to a terminal device, the session management network element obtains an address of a local application server corresponding to a user plane network element after the handover, and sends the address to the terminal device. The UE may access the local application server corresponding to the UPF after the handover. Therefore, the UE can obtain a reliable and low-latency service provided by the local application server.

The following separately describes in detail structures of a session management network element and a terminal device with reference to FIG. 9 to FIG. 12. It should be noted that the following session management network element and terminal device may be applied to the foregoing methods.

Figure 9:
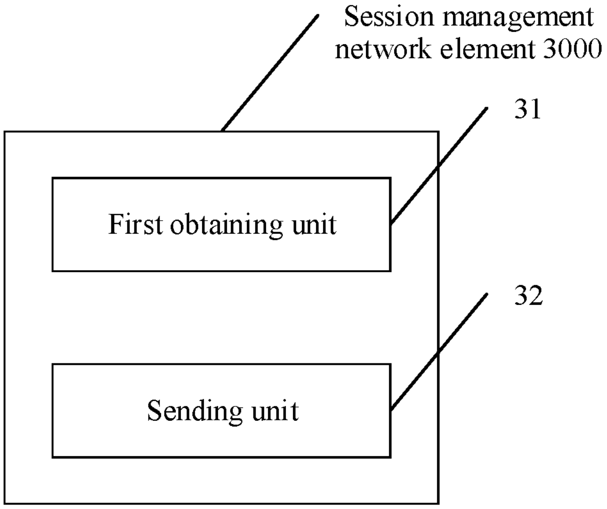
FIG. 9 is a structural block diagram of a session management network element according to an embodiment of this application.

FIG. 9 is a structural block diagram of a session management network element 3000 according to an embodiment of this application. The session management network element 3000 may include:

a first obtaining unit 31, configured to obtain, based on a user plane network element after a handover and a correspondence between a user plane network element and an address of a local application server, an address of a local application server corresponding to the user plane network element after the handover, where the correspondence between the user plane network element and the address of the local application server is used to indicate an address of a local application server, in one or more application servers that are deployed on a network and that provide a same service, that can provide the service for a terminal device when the terminal device accesses one user plane network element; and a sending unit 32, configured to send, to the terminal device, the address of the local application server corresponding to the user plane network element after the handover.

Further, the local application server comprises an application server with a highest priority in the one or more application servers that provide the same service, or an application server topologically closest to the user plane network element that the terminal device accesses.

The session management network element 3000 may further include: a storage unit, configured to store the correspondence between the user plane network element and the address of the local application server.

In an implementation, the storage unit is specifically configured to: receive a correspondence, sent by a network exposure network element, between the user plane network element and an address of a registered local application server, and store the correspondence into a stored correspondence between a user plane network element and an address of a local application server.

In another implementation, the storage unit is specifically configured to: receive and store a correspondence, configured by an operations support system, between the user plane network element and the address of the local application server.

The session management network element 3000 may further include: a first receiving unit, configured to receive a first enabling identifier, sent by the network exposure network element, for pushing the address of the local application server for the service; or a second receiving unit, configured to receive a first enabling identifier, configured by the operations support system, for pushing the address of the local application server for the service.

Specifically, the first enabling identifier is used to indicate the session management network element 3000 to push the address of the local application server to the terminal device after the handover occurs between user plane network elements corresponding to the terminal device.

The session management network element 3000 may further include: a second obtaining unit, configured to obtain subscription information of the terminal device from a unified data management network element, where the subscription information includes a second enabling identifier for pushing the address of the local application server to the terminal device; and a first determining unit, configured to determine, based on the subscription information, to push the address of the local application server to the terminal device.

The session management network element 3000 may further include: a third receiving unit, configured to receive an identifier and/or a user attribute of the terminal device that are/is sent by the operations support system and that enable/enables a function of pushing the address of the local application server; and a second determining unit, configured to determine, based on the identifier and/or the user attribute of the terminal device, to push the address of the local application server to the terminal device.

The session management network element 3000 may further include: a fourth receiving unit, configured to receive an identifier that is of the terminal device and sent by an application network element and that enables a function of pushing the address of the local application server; and a third determining unit, configured to determine, based on the identifier of the terminal device, to push the address of the local application server to the terminal device.

Further, the sending unit 32 is specifically configured to: send an application trigger request to the terminal device, where the application trigger request includes the address of the local application server corresponding to the user plane network element after the handover; or send, to the application network element, the address of the local application server corresponding to the user plane network element after the handover, where the application network element sends, to the terminal device, the address of the local application server corresponding to the user plane network element after the handover.

According to the session management network element 3000 provided in this embodiment of this application, in a scenario in which a handover occurs between UPFs corresponding to UE, the UE may access a local application server corresponding to a UPF after the handover. Therefore, the UE can obtain a reliable and low-latency service provided by the local application server.

Figure 10:
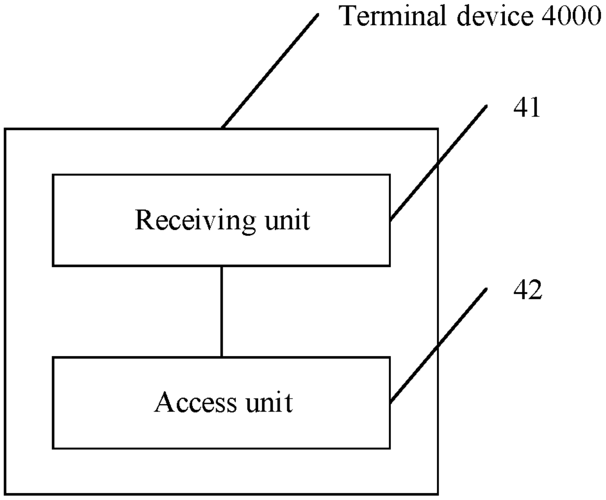
FIG. 10 is a structural block diagram of a terminal device according to an embodiment of this application.

FIG. 10 is a structural block diagram of a terminal device 4000 according to an embodiment of this application. The terminal device 4000 may include:

a receiving unit 41, configured to receive an application trigger request, where the application trigger request includes an address of a local application server corresponding to a user plane network element after a handover; and an access unit 42, configured to access the local application server based on the address of the local application server corresponding to the user plane network element after the handover.

Further, the receiving unit 41 is specifically configured to receive the application trigger request sent by a session management network element or an application network element.

According to the terminal device 4000 provided in this embodiment of this application, in a scenario in which a handover occurs between UPFs corresponding to UE, the UE may access a local application server corresponding to a UPF after the handover. Therefore, the UE can obtain a reliable and low-latency service provided by the local application server.

Figure 11:
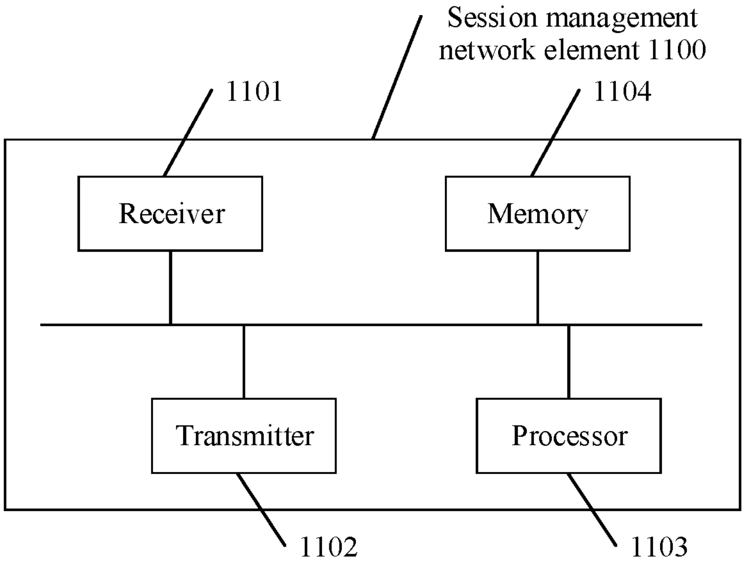
FIG. 11 is a schematic diagram of a hardware structure of a session management network element according to an embodiment of this application.

FIG. 11 is a schematic diagram of a hardware structure of a session management network element 1100 according to an embodiment of this application. The session management network element 1100 may include a receiver 1101, a transmitter 1102, a processor 1103, and a memory 1104. The receiver 1101, the transmitter 1102, the processor 1103, and the memory 1104 are connected to each other by using a communications line.

The memory 1104 includes but is not limited to a random access memory (RAM), a read-only memory (ROM), an erasable programmable read-only memory (EPROM), or a compact disc read-only memory (CD-ROM). The memory 1104 is configured to store a related instruction and related data.

The receiver 1101 is configured to receive data and/or a signal, and the transmitter 1102 is configured to send data and/or a signal. The transmitter 1102 and the receiver 1101 may be independent devices, or may be an integrated device.

The processor 1103 may include one or more processors, for example, includes one or more central processing units (CPU). When the processor 1103 is one CPU, the CPU may be a single-core CPU, or may be a multi-core CPU.

Specifically, in an embodiment, a related function implemented by the first obtaining unit 31 in FIG. 9 may be implemented by one or more processors, a related function implemented by the sending unit 32 may be implemented by the transmitter 1102, a related function implemented by the first, second, or third receiving unit may be implemented by the receiver 1101, and a related function implemented by the storage unit may be implemented by the memory 1104. The processor 1103 is configured to obtain an address of a local application server corresponding to a user plane network element after a handover, for example, perform step S501 in the embodiment shown in FIG. 5. The transmitter 1102 is configured to send, to a terminal device, the address of the local application server corresponding to the user plane network element after the handover, for example, perform step S502 in the embodiment shown in FIG. 5.

For specific implementation, refer to descriptions of the foregoing method embodiments.

According to the session management network element 1100 provided in this embodiment of this application, in a scenario in which a handover occurs between UPFs corresponding to UE, the UE may access a local application server corresponding to a UPF after the handover. Therefore, the UE can obtain a reliable and low-latency service provided by the local application server.

Figure 12:
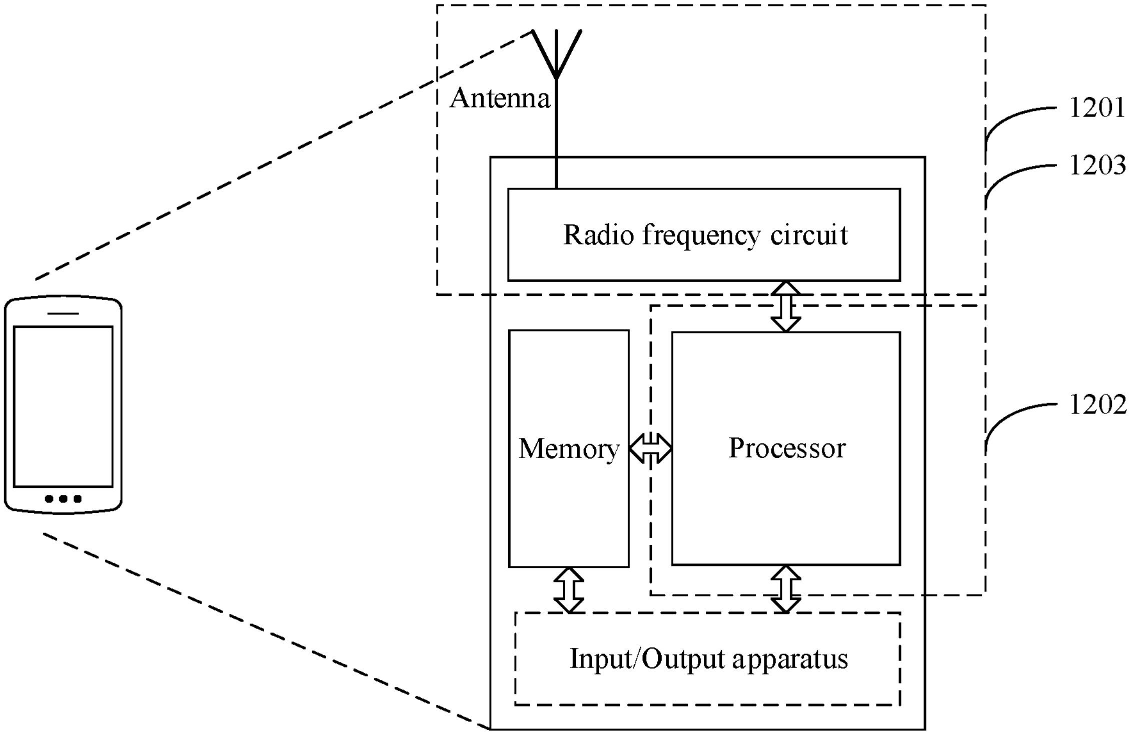
FIG. 12 is a schematic diagram of a hardware structure of a terminal device according to an embodiment of this application.

FIG. 12 is a schematic diagram of a hardware structure of a terminal device according to an embodiment of this application. For ease of understanding and illustration, an example in which the terminal device is a mobile phone is used in FIG. 12. As shown in FIG. 12, the terminal device includes a processor, a memory, a radio frequency circuit, an antenna, and an input/output apparatus. The processor is mainly configured to process a communications protocol and communication data, control the terminal device, execute a software program, process data of a software program, or the like. The memory is mainly configured to store a software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user and output data to the user. It should be noted that some types of terminal devices may not have an input and output apparatus.

When needing to send data, after performing baseband processing on to-be-sent data, the processor outputs a baseband signal to the radio frequency circuit. The radio frequency circuit performs radio frequency processing on the baseband signal and then sends the radio frequency signal to outside in a form of an electromagnetic wave by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 12 shows only one memory and one processor. In an actual terminal device product, there may be one or more processors and one or more memories. The memory may also be referred to as a storage medium, a storage device, or the like. The memory may be disposed independently of the processor, or may be integrated with the processor. This is not limited in this embodiment of this application.

In this embodiment of this application, the antenna and the radio frequency circuit that have a transceiver function may be considered as a receiving unit and a sending unit (which may also be collectively referred to as a transceiver unit) of the terminal device, and the processor having a processing function may be considered as a processing unit of the terminal device. As shown in FIG. 12, the terminal device includes a receiving unit 1201, a processing unit 1202, and a sending unit 1203. The receiving unit 1201 may also be referred to as a receiver, a receiver, a receiver circuit, or the like. The sending unit 1203 may also be referred to as a transmitter, a transmitter, a transmitter, a transmitter circuit, or the like. The processing unit may also be referred to as a processor, a processing board, a processing module, a processing apparatus, or the like.

For example, in an embodiment, the receiving unit 1201 is configured to perform step S502 in the embodiment shown in FIG. 5, to receive an application trigger request. The processing unit 1202 is configured to perform step S503 in the embodiment shown in FIG. 5, to access a local application server based on an address of the local application server corresponding to a user plane network element after a handover.

For details, refer to the descriptions in the method embodiments.

According to the terminal device provided in this embodiment of this application, in a scenario in which a handover occurs between UPFs corresponding to UE, the UE may access a local application server corresponding to a UPF after the handover. Therefore, the UE can obtain a reliable and low-latency service provided by the local application server.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

A person of ordinary skill in the art may understand that all or some of the procedures of the methods in the embodiments may be implemented by a computer program instructing relevant hardware. The program may be stored in a computer-readable storage medium. When the program is executed, the procedures of the methods in the embodiments may be included. The foregoing storage medium includes: any medium that can store program code, such as a read-only memory (ROM), a random access memory (RAM), a magnetic disk, or an optical disc.

What is claimed is:

1. An application server switching method, applied to a scenario in which a handover occurs between user plane network elements corresponding to a terminal device, the method comprising:

obtaining, by a session management network element based on a user plane network element of the user plane network elements after the handover and a correspondence between the user plane network element and an address of a local application server of one or more application servers deployed on a network and that provide a service to the terminal device based on the terminal device accessing the user plane network element, the address of the local application server corresponding to the user plane network element after the handover, wherein the correspondence between the user plane network element and the address of the local application server is used to indicate the address of the local application server; and sending, by the session management network element to the terminal device, the address of the local application server corresponding to the user plane network element after the handover.

2. The method according to claim 1, wherein the local application server comprises a highest priority application server of the one or more application servers, or a topologically closest application server of the one or more application servers to the user plane network element that the terminal device accesses.

3. The method according to claim 1, further comprising: storing, by the session management network element, the correspondence between the user plane network element and the address of the local application server.

4. The method according to claim 3, wherein the storing, by the session management network element, of the correspondence between the user plane network element and the address of the local application server comprises:

receiving, by the session management network element from a network exposure network element, a correspondence between the user plane network element and an address of a registered local application server, and storing the correspondence between the user plane network element and the address of the registered local application server as the correspondence between the user plane network element and the address of the local application server.

5. The method according to claim 3, wherein the storing, by the session management network element, of the correspondence between the user plane network element and the address of the local application server comprises:

receiving and storing, by the session management network element, a correspondence, configured by an operations support system, between the user plane network element and the address of the local application server.

6. The method according to claim 4, further comprising: receiving, by the session management network element, a enabling identifier, configured by the operations support system, for pushing the address of the local application server for the service.

7. The method according to claim 6, wherein the enabling identifier indicates the session management network element to push the address of the local application server to the terminal device after the handover occurs between the user plane network elements corresponding to the terminal device.

8. The method according to claim 1, further comprising: obtaining, by the session management network element, subscription information of the terminal device from a unified data management network element, wherein the subscription information comprises an enabling identifier for pushing the address of the local application server to the terminal device; and determining, by the session management network element based on the subscription information, to push the address of the local application server to the terminal device.

9. The method according to claim 5, further comprising: receiving, by the session management network element, one or more of an identifier or a user attribute of the terminal device from the operations support system and that enables a function of pushing the address of the local application server; and determining, by the session management network element based on the identifier or the user attribute of the terminal device, to push the address of the local application server to the terminal device.

10. The method according to claim 1, further comprising: receiving, by the session management network element from an application network element, an identifier of the terminal device that enables a function of pushing the address of the local application server; and determining, by the session management network element based on the identifier of the terminal device, to push the address of the local application server to the terminal device.

11. The method according to claim 1, wherein the sending, by the session management network element to the terminal device, of the address of the local application server corresponding to the user plane network element after the handover comprises:

sending, by the session management network element, an application trigger request to the terminal device, wherein the application trigger request comprises the address of the local application server corresponding to the user plane network element after the handover.

12. An application server switching method, applied to a scenario in which a handover occurs between user plane network elements corresponding to a terminal device, the method comprising:

receiving, by the terminal device, an application trigger request from a session management network element, the application trigger request comprising an address of a local application server corresponding to a user plane network element of the user plane elements after the handover; and accessing, by the terminal device, the local application server based on the address of the local application server corresponding to the user plane network element after the handover.

13. The application server switching method according to claim 12, wherein the session management network element obtains the address of the local application server corresponding to the user plane network element of the user plane elements after the handover based on the user plane network element after the handover and a correspondence between the user plane network element and the address of the local application server.

14. A session management network element, comprising:

at least one processor; and a memory having computer executable program code stored thereon that, when executed by the at least one processor, cause the session management network element to:

obtain, after a handover between user plane network elements corresponding to a terminal device, and based on a user plane network element of the user plane network elements after the handover and a correspondence between the user plane network element and an address of a local application server of one or more application servers deployed on a network and that provide a service to the terminal device based on the terminal device accessing the user plane network element, the address of the local application server corresponding to the user plane network element after the handover, wherein the correspondence between the user plane network element and the address of the local application server is used to indicate the address of the local application server; and send, to the terminal device, the address of the local application server corresponding to the user plane network element after the handover.

15. The session management network element according to claim 14, wherein the local application server comprises a highest priority application server of the one or more application servers, or a topologically closest application server of the one or more application servers to the user plane network element that the terminal device accesses.

16. The session management network element according to claim 14, wherein the session management network element is further caused to:

receive, from at least one of a network exposure network element or an operations support system, an enabling identifier for pushing the address of the local application server for the service.

17. The session management network element according to claim 14, wherein the session management network element is further caused to:

obtain subscription information of the terminal device from a unified data management network element, wherein the subscription information comprises an enabling identifier for pushing the address of the local application server to the terminal device.

18. The session management network element according to claim 14, wherein the session management network element is further caused to:

receive, from an application network element, an identifier of the terminal device that enables a function of pushing the address of the local application server.

19. The session management network element according to claim 14, wherein the session management network element is further caused to:

send an application trigger request to the terminal device, wherein the application trigger request comprises the address of the local application server corresponding to the user plane network element after the handover.

20. The session management network element according to claim 14, the session management network element is further caused to:

send, via the application network element to the terminal device, the address of the local application server corresponding to the user plane network element after the handover.

21. A terminal device applied to a scenario in which a handover occurs between user plane network elements corresponding to the terminal device comprising:

at least one processor; and a memory having computer executable program code stored thereon that, when executed by the at least one processor, cause the terminal device to:

receive an application trigger request from a session management network element, the application trigger request comprising an address of a local application server corresponding to a user plane network element of the user plane elements after the handover; and access the local application server based on the address of the local application server corresponding to the user plane network element after the handover.

* * * * *